US012056092B2

(12) United States Patent
Chuprun et al.

(10) Patent No.: US 12,056,092 B2
(45) Date of Patent: Aug. 6, 2024

(54) DATA FILE COMPRESSION

(71) Applicant: Chicago Mercantile Exchange Inc., Chicago, IL (US)

(72) Inventors: Anton Chuprun, Brooklyn, NY (US); Robert William Taylor, Chicago, IL (US); Sean Michael Downey, Chicago, IL (US); Matthew Scott Simpson, Wheaton, IL (US); Matthew Steven Waldis, Fairfield, CT (US); Jeffrey Graham Rosenthal, Lombard, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 0 days.

(21) Appl. No.: 18/195,803

(22) Filed: May 10, 2023

(65) Prior Publication Data

US 2023/0281165 A1 Sep. 7, 2023

Related U.S. Application Data

(63) Continuation of application No. 17/113,289, filed on Dec. 7, 2020, now Pat. No. 11,681,658, which is a
(Continued)

(51) Int. Cl.
*G06F 16/13* (2019.01)
*G06F 16/174* (2019.01)
(Continued)

(52) U.S. Cl.
CPC .......... *G06F 16/1744* (2019.01); *G06F 16/13* (2019.01); *G06Q 40/04* (2013.01)

(58) Field of Classification Search
CPC ..... G06F 16/13; G06F 16/1744; G06Q 40/04; G06Q 40/00
See application file for complete search history.

(56) References Cited

U.S. PATENT DOCUMENTS 7,039,610 B2 5/2006 Morano et al.
7,831,491 B2 11/2010 Newell et al.
(Continued)

FOREIGN PATENT DOCUMENTS

WO 2017142848 A1 8/2017

OTHER PUBLICATIONS

Coupon Blending,, Automated. Scalable. Available to All Market Participants., 2015, CME Group.
(Continued)

*Primary Examiner* — Etienne P Leroux
(74) *Attorney, Agent, or Firm* — Lempia Summerfield Katz LLC

(57) ABSTRACT

A computer implemented method of reducing data elements in a data file includes: receiving a data file including one or more primary data elements; storing the data file in a memory coupled to the processor; generating, from at least one of the one or more primary data elements, a plurality of supplemental data elements; determining whether any of the plurality of supplemental data elements and any of the primary data elements offset each other; and upon determining that at least one of the plurality of supplemental data elements and at least one of the primary data elements offset each other, deleting, from the data file, at least one of the offset supplemental data elements or primary data elements.

21 Claims, 10 Drawing Sheets

Related U.S. Application Data continuation of application No. 16/127,541, filed on Sep. 11, 2018, now Pat. No. 10,884,988.

(51) Int. Cl.
*G06Q 40/00* (2023.01)
*G06Q 40/04* (2012.01)

(56) References Cited

U.S. PATENT DOCUMENTS

| | | |
|---|---|---|
| 7,853,499 B2 | 12/2010 | Czupek et al. |
| 7,870,060 B2 | 1/2011 | Barker et al. |
| 8,266,030 B2 | 9/2012 | Milne et al. |
| 8,494,963 B2 | 7/2013 | Ballard |
| 2005/0096999 A1 | 5/2005 | Newell et al. |
| 2005/0203826 A1 | 9/2005 | Farrell et al. |
| 2010/0211523 A1* | 8/2010 | Schluetter ............ G06Q 40/04 705/37 |
| 2010/0258620 A1 | 10/2010 | Torreyson |
| 2011/0078070 A1 | 3/2011 | Barker et al. |
| 2013/0282554 A1 | 10/2013 | Boberski |
| 2014/0006243 A1 | 1/2014 | Boudreault et al. |
| 2014/0164286 A1 | 6/2014 | Jha et al. |
| 2014/0237007 A1 | 8/2014 | Carter |
| 2015/0026033 A1 | 1/2015 | Curran et al. |
| 2015/0073962 A1 | 3/2015 | Bixby et al. |
| 2015/0127513 A1 | 5/2015 | Studnitzer et al. |
| 2015/0161727 A1 | 6/2015 | Callaway et al. |
| 2015/0262305 A1 | 9/2015 | Bawadhankar et al. |
| 2015/0324914 A1 | 11/2015 | Zhan et al. |
| 2015/0379643 A1 | 12/2015 | Boberski et al. |
| 2016/0125399 A1 | 5/2016 | Burnham et al. |
| 2016/0140657 A1 | 5/2016 | Xythalis et al. |
| 2016/0155199 A1* | 6/2016 | Cohen ................ G06Q 40/00 705/37 |
| 2017/0331774 A1 | 11/2017 | Peck-Walden et al. |
| 2018/0082272 A1 | 3/2018 | Hilleary |

OTHER PUBLICATIONS

Extended European Search Report, from EP Application No. 19195593, Jan. 29, 2020, EP.

* cited by examiner

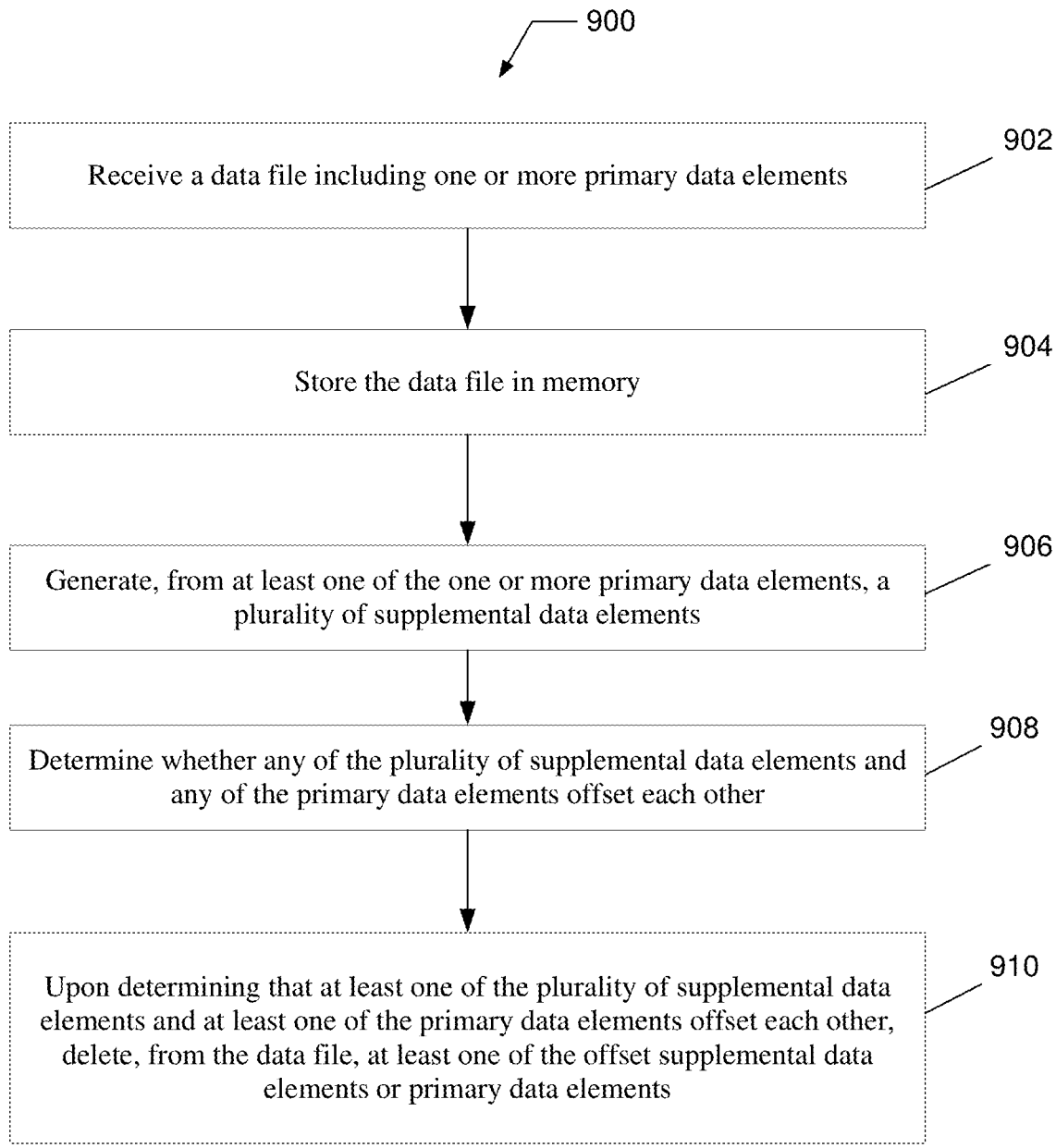

DATA FILE COMPRESSION

REFERENCE TO RELATED APPLICATIONS

This application claims priority to and the benefit as a continuation of U.S. patent application Ser. No. 17/113,289, filed Dec. 7, 2020, now U.S. Pat. No. 11,681,658, which is a continuation of U.S. patent application Ser. No. 16/127,541, filed Sep. 11, 2018, now U.S. Pat. No. 10,884,988, the entirety of all of which are incorporated by reference herein and relied upon.

BACKGROUND

While costs associated with computers and memory storage products have been falling with technological improvements, available computing resources of organizations remain at a premium. For example, as businesses increasingly move towards electronic communications, electronic processing of business processes, and electronically monitoring these communications and business processes, memory usage and computing processing power needs also correspondingly increase. In many cases, computing centers tasked with implementing and maintaining these electronic communications and business processes are constrained by existing or aging hardware and software resources, and budgetary concerns regarding the purchase, upgrade, or repair of the hardware and software infrastructure components. This may be true for large or small business organizations. In an illustrative example, a large organization may have many clients engaging in large numbers of electronic transactions, the details of which may be stored in memory. In many cases, these electronic transactions for multiple clients may occur continually and/or concurrently. As such computing resources, such as memory/storage, may be depleted and additional resources may need to be added to the system. Additionally, the data stored may be communicated between computing systems for processing. These communication requirements may result in slowed communications capability, as communication bandwidth on an organization's network may be a finite, limited resource. As such, a need has been recognized for improved data management capabilities, in storage capacity and transmission bandwidth management, while maintaining desired parameters/business value of the underlying data.

For example, computer systems and networks are commonly used to electronically trade securities and derivatives. Electronic trading involves traders transmitting electronic data transaction request messages to an exchange computing system that includes one or more hardware match engines that match, or attempt to match, the data transaction request messages. Once a trade event occurs, e.g., two of the transaction requests are matched, the result is that the market participants involved in the match have positions which may be cleared by the exchange computing system. Market participants, e.g., traders or clearing firms, may be associated with large portfolios comprising hundreds, thousands, or even millions of positions that eventually will be cleared. A position may be defined as open interest in a futures or options contract after a trade event has occurred, e.g., the outstanding derivatives (e.g., futures or options) contracts or post-trade commitments associated with a market participant. Each outstanding futures or options contract for a market participant, e.g., a trader, accordingly contributes to the open interest associated with that trader.

A market participant portfolio, which includes open interest/positions, is associated with a computing cost as well as a financial cost. From a computing resources standpoint, the exchange computing system may store all the post-trade positions associated with a trader, i.e., the trader's portfolio, in a data file, which may be processed and managed by the exchange computing system, and which may then be transmitted over a network to other institutions, such as regulators, or banks, or any other financial institution. Open positions may be represented as data elements in the data file.

Many financial institutions that work with the exchange computing system require traders to post capital requirements that are based on the open interest associated with each trader. Thus, in addition to the computing costs of maintaining, processing and transmitting large data files with many data elements, open interest may also trigger capital requirements, which can burden traders and reduce the overall amount of trading that can be performed by the trader.

BRIEF DESCRIPTION OF THE DRAWINGS

FIG. 9 illustrates an example flowchart for reducing data elements in a data file, according to some embodiments.

DETAILED DESCRIPTION

Exchange Computing System

Figure 1:
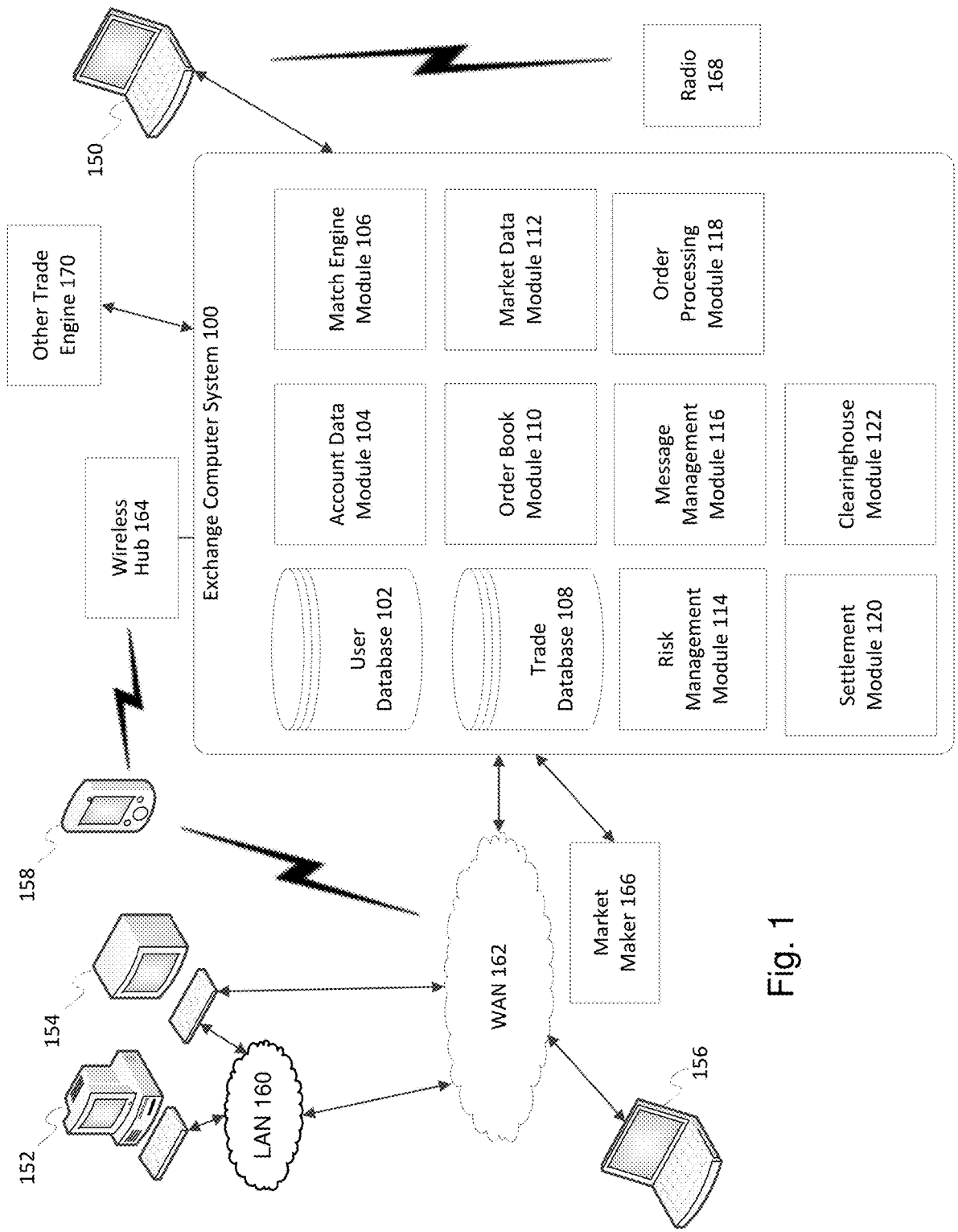
FIG. 1 depicts a computer network system, according to some embodiments.

The disclosed embodiments may be implemented in association with a data transaction processing system that processes data items or objects, such as an exchange computing system. Customer or user devices (e.g., client computers) may submit electronic data transaction request messages, e.g., inbound messages, to the data transaction processing system over a data communication network. The electronic data transaction request messages may include, for example, transaction matching parameters, such as instructions and/or values, for processing the data transaction request messages within the data transaction processing system. The instructions may be to perform transactions, e.g., buy or sell a quantity of a product at a specified price. Products, e.g., financial instruments, or order books representing the state of an electronic marketplace for a product, may be represented as data objects within the exchange computing system. The instructions may also be conditional, e.g., buy or sell a quantity of a product at a given value if a trade for the product is executed at some other reference value.

The data transaction processing system may include various specifically configured matching processors that match, e.g., automatically, electronic data transaction request messages for the same one of the data items or objects. The specifically configured matching processors may match, or attempt to match, electronic data transaction request messages based on multiple transaction matching parameters from the different client computers. Input electronic data transaction request messages may be received from different client computers over a data communication network, and output electronic data transaction result messages may be transmitted to the client computers and may be indicative of results of the attempts to match incoming electronic data transaction request messages. The specifically configured matching processors may additionally generate information indicative of a state of an environment (e.g., the state of the order book) based on the processing of the electronic data transaction request messages and report this information to data recipient computing systems via outbound messages published via one or more data feeds that contain electronic data transaction result messages. While the disclosed embodiments may be described with respect to electronic data transaction request and result messages, it will be appreciated that the disclosed embodiments may be implemented with respect to other technologies later developed, such as photonic, e.g., light-based, messages.

For example, one exemplary environment where the disclosed embodiments may be desirable is in financial markets, and in particular, electronic financial exchanges, such as a futures exchange, such as the Chicago Mercantile Exchange Inc. (CME).

An exchange provides one or more markets for the purchase and sale of various types of products including financial instruments such as stocks, bonds, futures contracts, options, currency, cash, and other similar instruments. Agricultural products and commodities are also examples of products traded on such exchanges. A futures contract is a product that is a contract for the future delivery of another financial instrument such as a quantity of grains, metals, oils, bonds, currency, or cash. Generally, each exchange establishes a specification for each market provided thereby that defines at least the product traded in the market, minimum quantities that must be traded, and minimum changes in price (e.g., tick size). For some types of products (e.g., futures or options), the specification further defines a quantity of the underlying product represented by one unit (or lot) of the product, and delivery and expiration dates. As will be described, the exchange may further define the matching algorithm, or rules, by which incoming orders will be matched/allocated to resting orders.

Generally, a market may involve market makers, such as market participants who consistently provide bids and/or offers at specific prices in a manner typically conducive to balancing risk, and market takers who may be willing to execute transactions at prevailing bids or offers may be characterized by more aggressive actions so as to maintain risk and/or exposure as a speculative investment strategy. From an alternate perspective, a market maker may be considered a market participant who places an order to sell at a price at which there is no previously or concurrently provided counter order. Similarly, a market taker may be considered a market participant who places an order to buy at a price at which there is a previously or concurrently provided counter order. A balanced and efficient market may involve both market makers and market takers, coexisting in a mutually beneficial basis. The mutual existence, when functioning properly, may facilitate liquidity in the market such that a market may exist with "tight" bid-ask spreads (e.g., small difference between bid and ask prices) and a "deep" volume from many currently provided orders such that large quantity orders may be executed without driving prices significantly higher or lower.

In many cases, market makers may place bids and asks on both sides of a market, e.g., a bid for a contract and an ask for the same contract. For example, market makers may be incentivized to execute bid and ask trades on both sides of a contract, or to place a bid request and an ask request on the same financial instrument. As many of those trades execute, i.e., the market maker's bid and ask positions are matched (with other traders), a market maker's portfolio may include hundreds or thousands of post-trade positions that need to be cleared. An exchange computing system typically prevents such bids and asks from the same market participant from matching each other through self-match prevention systems. For information and examples about self-match prevention systems, see U.S. Patent Publication No. 2015/0026033, filed on Oct. 3, 2014, entitled "Efficient Self-Match Prevention In An Electronic Match Engine", assigned to the assignee of the present application, the entirety of which is incorporated by reference herein and relied upon.

A financial instrument trading system, such as a futures exchange, such as the Chicago Mercantile Exchange Inc. (CME), provides a contract market where financial instruments, e.g., futures and options on futures, are traded using electronic systems. "Futures" is a term used to designate all contracts for the purchase or sale of financial instruments or physical commodities for future delivery or cash settlement on a commodity futures exchange. A futures contract is a legally binding agreement to buy or sell a commodity at a specified price at a predetermined future time. An option contract is the right, but not the obligation, to sell or buy the underlying instrument (in this case, a futures contract) at a specified price on or before a certain expiration date. An option contract offers an opportunity to take advantage of futures price moves without actually having a futures position. The commodity to be delivered in fulfillment of the contract, or alternatively the commodity for which the cash market price shall determine the final settlement price of the futures contract, is known as the contract's underlying reference or "underlier." The underlying or underlier for an options contract is the corresponding futures contract that is purchased or sold upon the exercise of the option.

The terms and conditions of each futures contract are standardized as to the specification of the contract's underlying reference commodity, the quality of such commodity, quantity, delivery date, and means of contract settlement. Cash settlement is a method of settling a futures contract whereby the parties effect final settlement when the contract expires by paying/receiving the loss/gain related to the contract in cash, rather than by effecting physical sale and purchase of the underlying reference commodity at a price determined by the futures contract, price. Options and futures may be based on more generalized market indicators, such as stock indices, interest rates, futures contracts and other derivatives.

An exchange may provide for a centralized "clearing house" through which trades made must be confirmed, matched, and settled each day until offset or delivered. The clearing house may be an adjunct to an exchange, and may be an operating division of an exchange, which is responsible for settling trading accounts, clearing trades, collecting and maintaining performance bond funds, regulating delivery, and reporting trading data. One of the roles of the clearing house is to mitigate credit risk. Clearing is the procedure through which the clearing house becomes buyer to each seller of a futures contract, and seller to each buyer, also referred to as a novation, and assumes responsibility for protecting buyers and sellers from financial loss due to breach of contract, by assuring performance on each contract. A clearing member is a firm qualified to clear trades through the clearing house.

An exchange computing system may operate under a central counterparty model, where the exchange acts as an intermediary between market participants for the transaction of financial instruments. In particular, the exchange computing system novates itself into the transactions between the market participants, i.e., splits a given transaction between the parties into two separate transactions where the exchange computing system substitutes itself as the counterparty to each of the parties for that part of the transaction, sometimes referred to as a novation. In this way, the exchange computing system acts as a guarantor and central counterparty and there is no need for the market participants to disclose their identities to each other, or subject themselves to credit or other investigations by a potential counterparty. For example, the exchange computing system insulates one market participant from the default by another market participant. Market participants need only meet the requirements of the exchange computing system. Anonymity among the market participants encourages a more liquid market environment as there are lower barriers to participation. The exchange computing system can accordingly offer benefits such as centralized and anonymous matching and clearing.

A match engine within a financial instrument trading system may comprise a transaction processing system that processes a high volume, e.g., millions, of messages or orders in one day. The messages are typically submitted from market participant computers. Exchange match engine systems may be subject to variable messaging loads due to variable market messaging activity. Performance of a match engine depends to a certain extent on the magnitude of the messaging load and the work needed to process that message at any given time. An exchange match engine may process large numbers of messages during times of high volume messaging activity. With limited processing capacity, high messaging volumes may increase the response time or latency experienced by market participants.

Electronic messages such as incoming messages from market participants, i.e., "outright" messages, e.g., trade order messages, etc., are sent from client devices associated with market participants, or their representatives, to an electronic trading or market system.

Electronic Trading

Electronic trading of financial instruments, such as futures contracts, is conducted by market participants sending orders, such as to buy or sell one or more futures contracts, in electronic form to the exchange. These electronically submitted orders to buy and sell are then matched, if possible, by the exchange, i.e., by the exchange's matching engine, to execute a trade. Outstanding (unmatched, wholly unsatisfied/unfilled or partially satisfied/filled) orders are maintained in one or more data structures or databases referred to as "order books," such orders being referred to as "resting," and made visible, i.e., their availability for trading is advertised, to the market participants through electronic notifications/broadcasts, referred to as market data feeds. An order book is typically maintained for each product, e.g., instrument, traded on the electronic trading system and generally defines or otherwise represents the state of the market for that product, i.e., the current prices at which the market participants are willing buy or sell that product. As such, as used herein, an order book for a product may also be referred to as a market for that product.

Upon receipt of an incoming order to trade in a particular financial instrument, whether for a single-component financial instrument, e.g., a single futures contract, or for a multiple-component financial instrument, e.g., a combination contract such as a spread contract, a match engine, as described herein, will attempt to identify a previously received but unsatisfied order counter thereto, i.e., for the opposite transaction (buy or sell) in the same financial instrument at the same or better price (but not necessarily for the same quantity unless, for example, either order specifies a condition that it must be entirely filled or not at all).

Previously received but unsatisfied orders, i.e., orders which either did not match with a counter order when they were received or their quantity was only partially satisfied, referred to as a partial fill, are maintained by the electronic trading system in an order book database/data structure to await the subsequent arrival of matching orders or the occurrence of other conditions which may cause the order to be modified or otherwise removed from the order book.

If the match engine identifies one or more suitable previously received but unsatisfied counter orders, they, and the incoming order, are matched to execute a trade there between to at least partially satisfy the quantities of one or both the incoming order or the identified orders. If there remains any residual unsatisfied quantity of the identified one or more orders, those orders are left on the order book with their remaining quantity to await a subsequent suitable counter order, i.e., to rest. If the match engine does not identify a suitable previously received but unsatisfied counter order, or the one or more identified suitable previously received but unsatisfied counter orders are for a lesser quantity than the incoming order, the incoming order is placed on the order book, referred to as "resting", with original or remaining unsatisfied quantity, to await a subsequently received suitable order counter thereto. The match engine then generates match event data reflecting the result of this matching process. Other components of the electronic trading system, as will be described, then generate the respective order acknowledgment and market data messages and transmit those messages to the market participants.

Matching, which is a function typically performed by the exchange, is a process, for a given order which specifies a desire to buy or sell a quantity of a particular instrument at a particular price, of seeking/identifying one or more wholly or partially, with respect to quantity, satisfying counter orders thereto, e.g., a sell counter to an order to buy, or vice versa, for the same instrument at the same, or sometimes better, price (but not necessarily the same quantity), which are then paired for execution to complete a trade between the respective market participants (via the exchange) and at least partially satisfy the desired quantity of one or both of the order and/or the counter order, with any residual unsatisfied quantity left to await another suitable counter order, referred to as "resting." A match event may occur, for example, when an aggressing order matches with a resting order. In one embodiment, two orders match because one order includes instructions for or specifies buying a quantity of a particular instrument at a particular price, and the other order includes instructions for or specifies selling a (different or same) quantity of the instrument at a same or better price. It should be appreciated that performing an instruction associated with a message may include attempting to perform the instruction. Whether or not an exchange computing system is able to successfully perform an instruction may depend on the state of the electronic marketplace.

While the disclosed embodiments will be described with respect to a product by product or market by market implementation, e.g. implemented for each market/order book, it will be appreciated that the disclosed embodiments may be implemented so as to apply across markets for multiple products traded on one or more electronic trading systems, such as by monitoring an aggregate, correlated or other derivation of the relevant indicative parameters as described herein.

While the disclosed embodiments may be discussed in relation to futures and/or options on futures trading, it should be appreciated that the disclosed embodiments may be applicable to any equity, fixed income security, currency, commodity, options or futures trading system or market now available or later developed. It may be appreciated that a trading environment, such as a futures exchange as described herein, implements one or more economic markets where rights and obligations may be traded. As such, a trading environment may be characterized by a need to maintain market integrity, transparency, predictability, fair/equitable access and participant expectations with respect thereto. In addition, it may be appreciated that electronic trading systems further impose additional expectations and demands by market participants as to transaction processing speed, latency, capacity and response time, while creating additional complexities relating thereto. Accordingly, as will be described, the disclosed embodiments may further include functionality to ensure that the expectations of market participants are met, e.g., that transactional integrity and predictable system responses are maintained.

Financial instrument trading systems allow traders to submit orders and receive confirmations, market data, and other information electronically via electronic messages exchanged using a network. Electronic trading systems ideally attempt to offer a more efficient, fair and balanced market where market prices reflect a true consensus of the value of traded products among the market participants, where the intentional or unintentional influence of any one market participant is minimized if not eliminated, and where unfair or inequitable advantages with respect to information access are minimized if not eliminated.

Electronic marketplaces attempt to achieve these goals by using electronic messages to communicate actions and related data of the electronic marketplace between market participants, clearing firms, clearing houses, and other parties. The messages can be received using an electronic trading system, wherein an action or transaction associated with the messages may be executed. For example, the message may contain information relating to an order to buy or sell a product in a particular electronic marketplace, and the action associated with the message may indicate that the order is to be placed in the electronic marketplace such that other orders which were previously placed may potentially be matched to the order of the received message. Thus, the electronic marketplace may conduct market activities through electronic systems.

As may be perceived/experienced by the market participants from outside the Exchange or electronic trading system operated thereby, the following sequence describes how, at least in part, information may be propagated in such a system and how orders may be processed: (1) An opportunity is created at a matching engine of the Exchange, such as by placing a recently received but unmatched order on the order book to rest; (2) The matching engine creates an update reflecting the opportunity and sends it to a feed engine; (3) The feed engine multicasts it to all of the market participants to advertise the opportunity to trade; (4) The market participants evaluate the opportunity and each, upon completion of their evaluation, may or may not choose to respond with an order responsive to the resting order, i.e. counter to the resting order; (5) The Exchange gateway receives any counter orders generated by the market participants, sends confirmation of receipt back directly to each submitting market participant, and forwards the received orders to the matching engine; and (6) The matching engine evaluates the received orders and matches the first arriving order against the resting opportunity and a trade is executed.

Electronic Data Transaction Request/Result Messages and Market Data Feeds

As used herein, a financial message, or an electronic message, refers both to messages communicated by market participants to an electronic trading or market system and vice versa. The messages may be communicated using packeting or other techniques operable to communicate information between systems and system components. Some messages may be associated with actions to be taken in the electronic trading or market system. In particular, in one embodiment, upon receipt of a request, a token is allocated and included in a TCP shallow acknowledgment transmission sent back to the participant acknowledging receipt of the request. It should be appreciated that while this shallow acknowledgment is, in some sense, a response to the request, it does not confirm the processing of an order included in the request. The participant, i.e., their device, then sends back a TCP acknowledgment which acknowledges receipt of the shallow acknowledgment and token.

Financial messages communicated to the electronic trading system, also referred to as "inbound" messages, may include associated actions that characterize the messages, such as trader orders, order modifications, order cancellations and the like, as well as other message types. Inbound messages may be sent from client devices associated with market participants, or their representatives, e.g., trade order messages, etc., to an electronic trading or market system. For example, a market participant may submit an electronic message to the electronic trading system that includes an associated specific action to be undertaken by the electronic trading system, such as entering a new trade order into the market or modifying an existing order in the market. In one embodiment, if a participant wishes to modify a previously sent request, e.g., a prior order which has not yet been processed or traded, they may send a request message comprising a request to modify the prior request. In one exemplary embodiment, the incoming request itself, e.g., the inbound order entry, may be referred to as an iLink message. iLink is a bidirectional communications/message protocol/message format implemented by the Chicago Mercantile Exchange Inc.

Financial messages communicated from the electronic trading system, referred to as "outbound" messages, may include messages responsive to inbound messages, such as confirmation messages, or other messages such as market update messages, quote messages, and the like. Outbound messages, or electronic data transaction result messages, may be disseminated via data feeds.

Financial messages may further be categorized as having or reflecting an impact on a market or electronic marketplace, also referred to as an "order book" or "book," for a traded product, such as a prevailing price therefore, number of resting orders at various price levels and quantities thereof, etc., or not having or reflecting an impact on a market or a subset or portion thereof. In one embodiment, an electronic order book may be understood to be an electronic collection of the outstanding or resting orders for a financial instrument.

For example, a request to place a trade may result in a response indicative of the trade either being matched with, or being rested on an order book to await, a suitable counter-order. This response may include a message directed solely to the trader who submitted the order to acknowledge receipt of the order and report whether it was matched, and the extent thereof, or rested. The response may further include a message to all market participants reporting a change in the order book due to the order, or an electronic data transaction result message. This response may take the form of a report of the specific change to the order book, e.g., an order for quantity X at price Y was added to the book (referred to, in one embodiment, as a Market By Order message), or may simply report the result, e.g., price level Y now has orders for a total quantity of Z (where Z is the sum of the previous resting quantity plus quantity X of the new order). In some cases, requests may elicit a non-impacting response, such as temporally proximate to the receipt of the request, and then cause a separate market-impact reflecting response at a later time. For example, a stop order, fill or kill order (FOK), also known as an immediate or cancel order, or other conditional request may not have an immediate market impacting effect, if at all, until the requisite conditions are met.

An acknowledgement or confirmation of receipt, e.g., a non-market impacting communication, may be sent to the trader simply confirming that the order was received. Upon the conditions being met and a market impacting result thereof occurring, a market-impacting message may be transmitted as described herein both directly back to the submitting market participant and to all market participants (in a Market By Price "MBP", or Market By Order "MBO"). It should be appreciated that additional conditions may be specified, such as a time or price limit, which may cause the order to be dropped or otherwise canceled and that such an event may result in another non-market-impacting communication instead. In some implementations, market impacting communications may be communicated separately from non-market impacting communications, such as via a separate communications channel or feed.

For additional details and descriptions of different market data feeds, see U.S. Patent Publication No. 2017/0331774, filed on May 16, 2016, entitled "Systems and Methods for Consolidating Multiple Feed Data", assigned to the assignee of the present application, the entirety of which is incorporated by reference herein and relied upon.

It should be further appreciated that various types of market data feeds may be provided which reflect different markets or aspects thereof. Market participants may then, for example, subscribe to receive those feeds of interest to them. For example, data recipient computing systems may choose to receive one or more different feeds. As market impacting communications usually tend to be more important to market participants than non-impacting communications, this separation may reduce congestion and/or noise among those communications having or reflecting an impact on a market or portion thereof. Furthermore, a particular market data feed may only communicate information related to the top buy/sell prices for a particular product, referred to as "top of book" feed, e.g., only changes to the top 10 price levels are communicated. Such limitations may be implemented to reduce consumption of bandwidth and message generation resources. In this case, while a request message may be considered market-impacting if it affects a price level other than the top buy/sell prices, it will not result in a message being sent to the market participants.

Examples of the various types of market data feeds which may be provided by electronic trading systems, such as the CME, in order to provide different types or subsets of market information or to provide such information in different formats include Market By Order, Market Depth (also known as Market by Price to a designated depth of the book), e.g., CME offers a 10-deep market by price feed, Top of Book (a single depth Market by Price feed), and combinations thereof. There may also be all manner of specialized feeds in terms of the content, i.e., providing, for example, derived data, such as a calculated index.

Market data feeds may be characterized as providing a "view" or "overview" of a given market, an aggregation or a portion thereof or changes thereto. For example, a market data feed, such as a Market By Price ("MBP") feed, may convey, with each message, the entire/current state of a market, or portion thereof, for a particular product as a result of one or more market impacting events. For example, an MBP message may convey a total quantity of resting buy/sell orders at a particular price level in response to a new order being placed at that price. An MBP message may convey a quantity of an instrument which was traded in response to an incoming order being matched with one or more resting orders. MBP messages may only be generated for events affecting a portion of a market, e.g., only the top 10 resting buy/sell orders and, thereby, only provide a view of that portion. As used herein, a market impacting request may be said to impact the "view" of the market as presented via the market data feed.

An MBP feed may utilize different message formats for conveying different types of market impacting events. For example, when a new order is rested on the order book, an MBP message may reflect the current state of the price level to which the order was added, e.g., the new aggregate quantity and the new aggregate number of resting orders. As can be seen, such a message conveys no information about the individual resting orders, including the newly rested order, themselves to the market participants. Only the submitting market participant, who receives a separate private message acknowledging the event, knows that it was their order that was added to the book. Similarly, when a trade occurs, an MBP message may be sent which conveys the price at which the instrument was traded, the quantity traded and the number of participating orders, but may convey no information as to whose particular orders contributed to the trade. MBP feeds may further batch reporting of multiple events, i.e., report the result of multiple market impacting events in a single message.

Alternatively, a market data feed, referred to as a Market By Order ("MBO") feed, may convey data reflecting a change that occurred to the order book rather than the result of that change, e.g., that order ABC for quantity X was added to price level Y or that order ABC and order XYZ traded a quantity X at a price Y. In this case, the MBO message identifies only the change that occurred so a market participant wishing to know the current state of the order book must maintain their own copy and apply the change reflected in the message to know the current state. As can be seen, MBO messages may carry much more data than MBP messages because MBO messages reflect information about each order, whereas MBP messages contain information about orders affecting some predetermined value levels. Furthermore, because specific orders, but not the submitting traders thereof, are identified, other market participants may be able to follow that order as it progresses through the market, e.g., as it is modified, canceled, traded, etc.

An MBP book data object may include information about multiple values. The MBP book data object may be arranged and structured so that information about each value is aggregated together. Thus, for a given value V (e.g., a price), the MBP book data object may aggregate all the information by value, such as for example, the number of orders having a certain position at value V, the quantity of total orders resting at value V, etc. Thus, the value field may be the key, or may be a unique field, within an MBP book data object. In one embodiment, the value for each entry within the MBP book data object is different. In one embodiment, information in an MBP book data object is presented in a manner such that the value field is the most granular field of information.

An MBO book data object may include information about multiple orders. The MBO book data object may be arranged and structured so that information about each order is represented. Thus, for a given order O, the MBO book data object may provide all of the information for order O. Thus, the order field may be the key, or may be a unique field, within an MBO book data object. In one embodiment, the order ID for each entry within the MBO book data object is different. In one embodiment, information in an MBO book data object is presented in a manner such that the order field is the most granular field of information.

Thus, the MBO book data object may include data about unique orders, e.g., all unique resting orders for a product, and the MBP book data object may include data about unique values, e.g., up to a predetermined level, e.g., top ten price or value levels, for a product.

It should be appreciated that the number, type and manner of market data feeds provided by an electronic trading system are implementation dependent and may vary depending upon the types of products traded by the electronic trading system, customer/trader preferences, bandwidth and data processing limitations, etc. and that all such feeds, now available or later developed, are contemplated herein. MBP and MBO feeds may refer to categories/variations of market data feeds, distinguished by whether they provide an indication of the current state of a market resulting from a market impacting event (MBP) or an indication of the change in the current state of a market due to a market impacting event (MBO).

Messages, whether MBO or MBP, generated responsive to market impacting events which are caused by a single order, such as a new order, an order cancellation, an order modification, etc., are fairly simple and compact and easily created and transmitted. However, messages, whether MBO or MBP, generated responsive to market impacting events which are caused by more than one order, such as a trade, may require the transmission of a significant amount of data to convey the requisite information to the market participants. For trades involving a large number of orders, e.g., a buy order for a quantity of 5000 which matches 5000 sell orders each for a quantity of 1, a significant amount of information may need to be sent, e.g., data indicative of each of the 5000 trades that have participated in the market impacting event.

In one embodiment, an exchange computing system may generate multiple order book objects, one for each type of view that is published or provided. For example, the system may generate an MBO book object and an MBP book object. It should be appreciated that each book object, or view for a product or market, may be derived from the MBO book object, which includes all the orders for a given financial product or market.

An inbound message may include an order that affects the MBO book object, the MBP book object, or both. An outbound message may include data from one or more of the structures within the exchange computing system, e.g., the MBO book object queues or the MBP book object queues.

Furthermore, each participating trader needs to receive a notification that their particular order has traded. Continuing with the example, this may require sending 5001 individual trade notification messages, or even 10,000+ messages where each contributing side (buy vs. sell) is separately reported, in addition to the notification sent to all of the market participants.

As detailed in U.S. Patent Publication No. 2015/0161727, the entirety of which is incorporated by reference herein and relied upon, it may be recognized that trade notifications sent to all market participants may include redundant information repeated for each participating trade and a structure of an MBP trade notification message may be provided which results in a more efficient communication of the occurrence of a trade. The message structure may include a header portion which indicates the type of transaction which occurred, i.e., a trade, as well as other general information about the event, an instrument portion which comprises data about each instrument which was traded as part of the transaction, and an order portion which comprises data about each participating order. In one embodiment, the header portion may include a message type, Transaction Time, Match Event Indicator, and Number of Market Data Entries ("No. MD Entries") fields. The instrument portion may include a market data update action indicator ("MD Update Action"), an indication of the Market Data Entry Type ("MD Entry Type"), an identifier of the instrument/security involved in the transaction ("Security ID"), a report sequence indicator ("Rpt Seq"), the price at which the instrument was traded ("MD Entry PX"), the aggregate quantity traded at the indicated price ("ConsTradeQty"), the number of participating orders ("NumberOfOrders"), and an identifier of the aggressor side ("Aggressor Side") fields. The order portion may further include an identifier of the participating order ("Order ID"), described in more detail below, and the quantity of the order traded ("MD Entry Size") fields. It should be appreciated that the particular fields included in each portion are implementation dependent and that different fields in addition to, or in lieu of, those listed may be included depending upon the implementation. It should be appreciated that the exemplary fields can be compliant with the FIX binary and/or FIX/FAST protocol for the communication of the financial information.

The instrument portion contains a set of fields, e.g., seven fields accounting for 23 bytes, which are repeated for each participating instrument. In complex trades, such as trades involving combination orders or strategies, e.g., spreads, or implied trades, there may be multiple instruments being exchanged among the parties. In one embodiment, the order portion includes only one field, accounting for 4 bytes, for each participating order which indicates the quantity of that order which was traded. As will be discussed below, the order portion may further include an identifier of each order, accounting for an additional 8 bytes, in addition to the quantity thereof traded. As should be appreciated, data which would have been repeated for each participating order, is consolidated or otherwise summarized in the header and instrument portions of the message thereby eliminating redundant information and, overall, significantly reducing the size of the message.

The disclosed embodiments may be applicable to the use of either an MBP market data feed and/or an MBO market data feed.

Matching and Transaction Processing

Market participants, e.g., traders, use software to send orders or messages to the trading platform. The order identifies the product, the quantity of the product the trader wishes to trade, a price at which the trader wishes to trade the product, and a direction of the order (i.e., whether the order is a bid, i.e., an offer to buy, or an ask, i.e., an offer to sell). It will be appreciated that there may be other order types or messages that traders can send including requests to modify or cancel a previously submitted order.

The exchange computer system monitors incoming orders received thereby and attempts to identify, i.e., match or allocate, as described herein, one or more previously received, but not yet matched, orders, i.e., limit orders to buy or sell a given quantity at a given price, referred to as "resting" orders, stored in an order book database, wherein each identified order is contra to the incoming order and has a favorable price relative to the incoming order. An incoming order may be an "aggressor" order, i.e., a market order to sell a given quantity at whatever may be the current resting bid order price(s) or a market order to buy a given quantity at whatever may be the current resting ask order price(s). An incoming order may be a "market making" order, i.e., a market order to buy or sell at a price for which there are currently no resting orders. In particular, if the incoming order is a bid, i.e., an offer to buy, then the identified order(s) will be an ask, i.e., an offer to sell, at a price that is identical to or higher than the bid price. Similarly, if the incoming order is an ask, i.e., an offer to sell, the identified order(s) will be a bid, i.e., an offer to buy, at a price that is identical to or lower than the offer price.

An exchange computing system may receive conditional orders or messages for a data object, where the order may include two prices or values: a reference value and a stop value. A conditional order may be configured so that when a product represented by the data object trades at the reference price, the stop order is activated at the stop value. For example, if the exchange computing system's order management module (described below) includes a stop order with a stop price of 5 and a limit price of 1 for a product, and a trade at 5 (i.e., the stop price of the stop order) occurs, then the exchange computing system attempts to trade at 1 (i.e., the limit price of the stop order). In other words, a stop order is a conditional order to trade (or execute) at the limit price that is triggered (or elected) when a trade at the stop price occurs.

Stop orders also rest on, or are maintained in, an order book to monitor for a trade at the stop price, which triggers an attempted trade at the limit price. In some embodiments, a triggered limit price for a stop order may be treated as an incoming order.

Upon identification (matching) of a contra order(s), a minimum of the quantities associated with the identified order and the incoming order is matched and that quantity of each of the identified and incoming orders become two halves of a matched trade that is sent to a clearing house. The exchange computer system considers each identified order in this manner until either all of the identified orders have been considered or all of the quantity associated with the incoming order has been matched, i.e., the order has been filled. If any quantity of the incoming order remains, an entry may be created in the order book database and information regarding the incoming order is recorded therein, i.e., a resting order is placed on the order book for the remaining quantity to await a subsequent incoming order counter thereto.

It should be appreciated that in electronic trading systems implemented via an exchange computing system, a trade price (or match value) may differ from (i.e., be better for the submitter, e.g., lower than a submitted buy price or higher than a submitted sell price) the limit price that is submitted, e.g., a price included in an incoming message, or a triggered limit price from a stop order.

As used herein, "better" than a reference value means lower than the reference value if the transaction is a purchase (or acquire) transaction, and higher than the reference value if the transaction is a sell transaction. Said another way, for purchase (or acquire) transactions, lower values are better, and for sell (or relinquish) transactions, higher values are better.

Traders access the markets on a trading platform using trading software that receives and displays at least a portion of the order book for a market, i.e., at least a portion of the currently resting orders, enables a trader to provide parameters for an order for the product traded in the market, and transmits the order to the exchange computer system. The trading software typically includes a graphical user interface to display at least a price and quantity of some of the entries in the order book associated with the market. The number of entries of the order book displayed is generally preconfigured by the trading software, limited by the exchange computer system, or customized by the user. Some graphical user interfaces display order books of multiple markets of one or more trading platforms. The trader may be an individual who trades on his/her behalf, a broker trading on behalf of another person or entity, a group, or an entity. Furthermore, the trader may be a system that automatically generates and submits orders.

If the exchange computer system identifies that an incoming market order may be filled by a combination of multiple resting orders, e.g., the resting order at the best price only partially fills the incoming order, the exchange computer system may allocate the remaining quantity of the incoming, i.e., that which was not filled by the resting order at the best price, among such identified orders in accordance with prioritization and allocation rules/algorithms, referred to as "allocation algorithms" or "matching algorithms," as, for example, may be defined in the specification of the particular financial product or defined by the exchange for multiple financial products. Similarly, if the exchange computer system identifies multiple orders contra to the incoming limit order and that have an identical price which is favorable to the price of the incoming order, i.e., the price is equal to or better, e.g., lower if the incoming order is a buy (or instruction to purchase, or instruction to acquire) or higher if the incoming order is a sell (or instruction to relinquish), than the price of the incoming order, the exchange computer system may allocate the quantity of the incoming order among such identified orders in accordance with the matching algorithms as, for example, may be defined in the specification of the particular financial product or defined by the exchange for multiple financial products.

An exchange responds to inputs, such as trader orders, cancellation, etc., in a manner as expected by the market participants, such as based on market data, e.g., prices, available counter-orders, etc., to provide an expected level of certainty that transactions will occur in a consistent and predictable manner and without unknown or unascertainable risks. Accordingly, the method by which incoming orders are matched with resting orders must be defined so that market participants have an expectation of what the result will be when they place an order or have resting orders and an incoming order is received, even if the expected result is, in fact, at least partially unpredictable due to some component of the process being random or arbitrary or due to market participants having imperfect or less than all information, e.g., unknown position of an order in an order book. Typically, the exchange defines the matching/allocation algorithm that will be used for a particular financial product, with or without input from the market participants. Once defined for a particular product, the matching/allocation algorithm is typically not altered, except in limited circumstance, such as to correct errors or improve operation, so as not to disrupt trader expectations. It will be appreciated that different products offered by a particular exchange may use different matching algorithms.

For example, a first-in/first-out (FIFO) matching algorithm, also referred to as a "Price Time" algorithm, considers each identified order sequentially in accordance with when the identified order was received. The quantity of the incoming order is matched to the quantity of the identified order at the best price received earliest, then quantities of the next earliest best price orders, and so on until the quantity of the incoming order is exhausted. Some product specifications define the use of a pro-rata matching algorithm, wherein a quantity of an incoming order is allocated to each of plurality of identified orders proportionally. Some exchange computer systems provide a priority to certain standing orders in particular markets. An example of such an order is the first order that improves a price (i.e., improves the market) for the product during a trading session. To be given priority, the trading platform may require that the quantity associated with the order is at least a minimum quantity. Further, some exchange computer systems cap the quantity of an incoming order that is allocated to a standing order on the basis of a priority for certain markets. In addition, some exchange computer systems may give a preference to orders submitted by a trader who is designated as a market maker for the product. Other exchange computer systems may use other criteria to determine whether orders submitted by a particular trader are given a preference. Typically, when the exchange computer system allocates a quantity of an incoming order to a plurality of identified orders at the same price, the trading host allocates a quantity of the incoming order to any orders that have been given priority. The exchange computer system thereafter allocates any remaining quantity of the incoming order to orders submitted by traders designated to have a preference, and then allocates any still remaining quantity of the incoming order using the FIFO or pro-rata algorithms. Pro-rata algorithms used in some markets may require that an allocation provided to a particular order in accordance with the pro-rata algorithm must meet at least a minimum allocation quantity. Any orders that do not meet or exceed the minimum allocation quantity are allocated to on a FIFO basis after the pro-rata allocation (if any quantity of the incoming order remains). More information regarding order allocation may be found in U.S. Pat. No. 7,853,499, the entirety of which is incorporated by reference herein and relied upon.

Other examples of matching algorithms which may be defined for allocation of orders of a particular financial product include: Price Explicit Time; Order Level Pro Rata; Order Level Priority Pro Rata; Preference Price Explicit Time; Preference Order Level Pro Rata; Preference Order Level Priority Pro Rata; Threshold Pro-Rata; Priority Threshold Pro-Rata; Preference Threshold Pro-Rata; Priority Preference Threshold Pro-Rata; and Split Price-Time Pro-Rata, which are described in U.S. patent application Ser. No. 13/534,499, filed on Jun. 27, 2012, entitled "Multiple Trade Matching Algorithms," published as U.S. Patent Application Publication No. 2014/0006243 A1, the entirety of which is incorporated by reference herein and relied upon.

With respect to incoming orders, some traders, such as automated and/or algorithmic traders, attempt to respond to market events, such as to capitalize upon a mispriced resting order or other market inefficiency, as quickly as possible. This may result in penalizing the trader who makes an errant trade, or whose underlying trading motivations have changed, and who cannot otherwise modify or cancel their order faster than other traders can submit trades there against. It may considered that an electronic trading system that rewards the trader who submits their order first creates an incentive to either invest substantial capital in faster trading systems, participate in the market substantially to capitalize on opportunities (aggressor side/lower risk trading) as opposed to creating new opportunities (market making/higher risk trading), modify existing systems to streamline business logic at the cost of trade quality, or reduce one's activities and exposure in the market. The result may be a lesser quality market and/or reduced transaction volume, and corresponding thereto, reduced fees to the exchange.

With respect to resting orders, allocation/matching suitable resting orders to match against an incoming order can be performed, as described herein, in many different ways. Generally, it will be appreciated that allocation/matching algorithms are only needed when the incoming order quantity is less than the total quantity of the suitable resting orders as, only in this situation, is it necessary to decide which resting order(s) will not be fully satisfied, which trader(s) will not get their orders filled. It can be seen from the above descriptions of the matching/allocation algorithms, that they fall generally into three categories: time priority/first-in-first-out ("FIFO"), pro rata, or a hybrid of FIFO and pro rata.

FIFO generally rewards the first trader to place an order at a particular price and maintains this reward indefinitely. So, if a trader is the first to place an order at price X, no matter how long that order rests and no matter how many orders may follow at the same price, as soon as a suitable incoming order is received, that first trader will be matched first. This "first mover" system may commit other traders to positions in the queue after the first move traders. Furthermore, while it may be beneficial to give priority to a trader who is first to place an order at a given price because that trader is, in effect, taking a risk, the longer that the trader's order rests, the less beneficial it may be. For instance, it could deter other traders from adding liquidity to the marketplace at that price because they know the first mover (and potentially others) already occupies the front of the queue.

With a pro rata allocation, incoming orders are effectively split among suitable resting orders. This provides a sense of fairness in that everyone may get some of their order filled. However, a trader who took a risk by being first to place an order (a "market turning" order) at a price may end up having to share an incoming order with a much later submitted order. Furthermore, as a pro rata allocation distributes the incoming order according to a proportion based on the resting order quantities, traders may place orders for large quantities, which they are willing to trade but may not necessarily want to trade, in order to increase the proportion of an incoming order that they will receive. This results in an escalation of quantities on the order book and exposes a trader to a risk that someone may trade against one of these orders and subject the trader to a larger trade than they intended. In the typical case, once an incoming order is allocated against these large resting orders, the traders subsequently cancel the remaining resting quantity which may frustrate other traders. Accordingly, as FIFO and pro rata both have benefits and problems, exchanges may try to use hybrid allocation/matching algorithms which attempt to balance these benefits and problems by combining FIFO and pro rata in some manner. However, hybrid systems define conditions or fixed rules to determine when FIFO should be used and when pro rata should be used. For example, a fixed percentage of an incoming order may be allocated using a FIFO mechanism with the remainder being allocated pro rata.

Clearing House

The clearing house of an exchange clears, settles and guarantees matched transactions in contracts occurring through the facilities of the exchange. In addition, the clearing house establishes and monitors financial requirements for clearing members and conveys certain clearing privileges in conjunction with the relevant exchange markets. Once a trade event occurs, e.g., two of the transaction requests are matched, the result is that the market participants involved in the match have positions which may be cleared by the exchange computing system. The clearing house may store all the positions associated with a market participant in a portfolio.

The clearing house establishes clearing level performance bonds (margins) for all products of the exchange and establishes minimum performance bond requirements for customers of such products. A performance bond, also referred to as a margin requirement, corresponds with the funds that must be deposited by a customer with his or her broker, by a broker with a clearing member or by a clearing member with the clearing house, for the purpose of insuring the broker or clearing house against loss on open futures or options contracts. This is not a part payment on a purchase. The performance bond helps to ensure the financial integrity of brokers, clearing members and the exchange as a whole. The performance bond refers to the minimum dollar deposit required by the clearing house from clearing members in accordance with their positions. Maintenance, or maintenance margin, refers to a sum, usually smaller than the initial performance bond, which must remain on deposit in the customer's account for any position at all times. The initial margin is the total amount of margin per contract required by the broker when a futures position is opened. A drop in funds below this level requires a deposit back to the initial margin levels, i.e., a performance bond call. If a customer's equity in any futures position drops to or under the maintenance level because of adverse price action, the broker must issue a performance bond/margin call to restore the customer's equity. A performance bond call, also referred to as a margin call, is a demand for additional funds to bring the customer's account back up to the initial performance bond level whenever adverse price movements cause the account to go below the maintenance.

The exchange derives its financial stability in large part by removing debt obligations among market participants as they occur. This is accomplished by determining a settlement price at the close of the market each day for each contract and marking all open positions to that price, referred to as "mark to market." Every contract is debited or credited based on that trading session's gains or losses. As prices move for or against a position, funds flow into and out of the trading account. In the case of the CME, each business day by 6:40 a.m. Chicago time, based on the mark-to-the-market of all open positions to the previous trading day's settlement price, the clearing house pays to or collects cash from each clearing member. This cash flow, known as settlement variation, is performed by CME's settlement banks based on instructions issued by the clearing house. All payments to and collections from clearing members are made in "same-day" funds. In addition to the 6:40 a.m. settlement, a daily intra-day mark-to-the market of all open positions, including trades executed during the overnight GLOBEX®, the CME's electronic trading systems, trading session and the current day's trades matched before 11:15 a.m., is performed using current prices. The resulting cash payments are made intra-day for same day value. In times of extreme price volatility, the clearing house has the authority to perform additional intra-day mark-to-the-market calculations on open positions and to call for immediate payment of settlement variation. CME's mark-to-the-market settlement system may differ from the settlement systems implemented by many other financial markets, including the interbank, Treasury securities, over-the-counter foreign exchange and debt, options, and equities markets, where participants regularly assume credit exposure to each other. In those markets, the failure of one participant can have a ripple effect on the solvency of the other participants. Conversely, CME's mark-to-the-market system may not allow losses to accumulate over time or allow a market participant the opportunity to defer losses associated with market positions.

While the disclosed embodiments may be described in reference to the CME, it should be appreciated that these embodiments are applicable to any exchange. Such other exchanges may include a clearing house that, like the CME clearing house, clears, settles and guarantees all matched transactions in contracts of the exchange occurring through its facilities. In addition, such clearing houses establish and monitor financial requirements for clearing members and convey certain clearing privileges in conjunction with the relevant exchange markets.

The disclosed embodiments are also not limited to uses by a clearing house or exchange for purposes of enforcing a performance bond or margin requirement. For example, a market participant may use the disclosed embodiments in a simulation or other analysis of a portfolio. In such cases, the settlement price may be useful as an indication of a value at risk and/or cash flow obligation rather than a performance bond. The disclosed embodiments may also be used by market participants or other entities to forecast or predict the effects of a prospective position on the margin requirement of the market participant.

Market Segment Gateway and Business Transaction Processing

In one embodiment, the disclosed system may include a Market Segment Gateway ("MSG") that is the point of ingress/entry and/or egress/departure for all transactions, i.e., the network traffic/packets containing the data therefore, specific to a single market at which the order of receipt of those transactions may be ascribed. An MSG or Market Segment Gateway may be utilized for the purpose of deterministic operation of the market. The electronic trading system may include multiple markets, and because the electronic trading system includes one MSG for each market/product implemented thereby, the electronic trading system may include multiple MSGs. For more detail on deterministic operation in a trading system, see U.S. Patent Publication No. 2015/0127513 entitled "Transactionally Deterministic High Speed Financial Exchange Having Improved, Efficiency, Communication, Customization, Performance, Access, Trading Opportunities, Credit Controls, And Fault Tolerance" and filed on Nov. 7, 2013 ("the '513

Publication"), the entire disclosure of which is incorporated by reference herein and relied upon.

For example, a participant may send a request for a new transaction, e.g., a request for a new order, to the MSG. The MSG extracts or decodes the request message and determines the characteristics of the request message.

The MSG may include, or otherwise be coupled with, a buffer, cache, memory, database, content addressable memory, data store or other data storage mechanism, or combinations thereof, which stores data indicative of the characteristics of the request message. The request is passed to the transaction processing system, e.g., the match engine.

An MSG or Market Segment Gateway may be utilized for the purpose of deterministic operation of the market. Transactions for a particular market may be ultimately received at the electronic trading system via one or more points of entry, e.g., one or more communications interfaces, at which determinism may be applied, which as described may be at the point where matching occurs, e.g., at each match engine (where there may be multiple match engines, each for a given product/market, or moved away from the point where matching occurs and closer to the point where the electronic trading system first becomes "aware" of the incoming transaction, such as the point where transaction messages, e.g., orders, ingress the electronic trading system. Generally, the terms "determinism" or "transactional determinism" may refer to the processing, or the appearance thereof, of orders in accordance with defined business rules. Accordingly, as used herein, the point of determinism may be the point at which the electronic trading system ascribes an ordering to incoming transactions/orders relative to other incoming transactions/orders such that the ordering may be factored into the subsequent processing, e.g., matching, of those transactions/orders as will be described.

As described above, as used herein a business transaction may be defined as one or more operations or acts which are undertaken according to one or more associated business rules (including industry, legal or regulatory requirements or customs) to accomplish a business or commercial purpose, which may include compliance with industry, regulatory or legal requirements. A business transaction may be implemented by one or more computer processing and/or database operations/program steps, which themselves may be referred to as transactions. Business transactions, as defined by the associated business rules, may be characterized as deterministic in that they be characterized by an interdependency or relationship which affects their result, such as a dependency on the order in which they are processed, such as a temporal order, and/or a dependency on real time processing, as defined by business rules, so as to effect the business/commercial purpose and/or meet participant expectations, referred to herein as "transactional determinism." Generally, a set of deterministic transactions will provide a particular result when executed in one order and a different result when executed in a different order. In some applications, deterministic processing may be preferred/prioritized over real time processing.

For example, wherein the business rules define a first-in-first-out ("FIFO") process for matching offers with counter-offers to effect an exchange or trade, when an offer transaction is received to which no prior counter offer transaction has been previously received, it should be matched with the next suitable counter offer transaction received rather than a later received counter offer transactions. It will be appreciated that the processing of a given transaction may involve delaying further processing of that transaction in favor of a later received transaction, such as dependent upon conditions specified by the earlier transaction and/or the defined business rules. It will further be appreciated that, at a minimum, any representation of the current state of a business environment, e.g. market, or changes thereto, in which the business transactions are transacted should present an accurate reflection of the actual state or state change in accordance with the defined business rules, so as to not mislead participants or provide an unfair advantage. In the disclosed embodiments, the phrase "financial transaction" will refer to a business transaction involving the purchase or sale of financial instruments, such as futures contracts or options thereon, spread or other combination contracts and the like, as will be described. As was described above, electronic trading systems generally define their business rules and then must ensure transactional determinism in compliance therewith.

Generally, when the rate of business transaction processing is less than the underlying instructions processing capacity of the underlying general purpose processor, general performance optimizations implemented by the processor or operating system may be hidden or otherwise imperceptible at the transactional level. That is, the processor is able to perform these optimizations (e.g., page switches, instruction pre fetch, branch mis-predictions, cache miss processing, error/packet recovery) fast enough so as not to affect the executing business application. However, as the rate and volume of transactions increases, contention for internal processor resources, such as memory bandwidth, also increases. Accordingly, the impact of internal optimizations on the executing application may no longer be imperceptible. In a multiprocessor environment, this impact may affect the ability to maintain application tasks/processes, which are divided among multiple processors, in sync which each other which may result in out of order execution of one or more transactions.

In the exemplary embodiments, all transactions are ultimately received at the electronic trading system via a single point of entry, i.e. a single communications interface, at which the disclosed embodiments apply determinism, which as described is moved away from the point where matching occurs and closer to the point where the electronic trading system first becomes "aware" of the incoming transaction. This may require improving the performance of this communications interface to process the influx of transactions without being overwhelmed. In some implementations, more orders may be submitted by market participants via more parallel inputs/channels/communications pathways implemented to increase capacity and/or reduce resource contention. However, for many of the reasons described above, parallel communication paths complicate deterministic behavior, e.g. by creating opportunity, such a via asymmetric delays among communications paths, for later transmitted or arriving transactions to overtake earlier arriving or transmitted transactions, and may require mechanisms to discriminate among closely received transactions and arbitrate among simultaneously, or substantially simultaneously, received transactions, e.g. transactions received at the same time or received within a threshold of time unresolvable by the system. Accordingly, mechanisms may be implemented to improve and impart deterministic handling of discrimination and arbitration among closely received transactions.

As was described above, to gain and maintain the trust and confidence of market participants and encourage participation, electronic trading systems ideally attempt to offer a more efficient, fair and balanced market where market prices reflect a true consensus of the value of traded products among the market participants, and which minimize, if not eliminate, surreptitious or overt subversion, influence of, or manipulation by, any one or more market participants, intentional or otherwise, and unfair or inequitable advantages, with respect to access to information or opportunities. To accomplish these goals, for example, electronic trading systems should operate in a deterministic, i.e., a causal, predictable, or otherwise expected, manner as understood and experienced by the market participants, i.e., the customers of the Exchange. Electronic trading systems which implement markets which are overtly or covertly inefficient, unfair or inequitable risk not only losing the trust, along with the patronage, of market participants, but also increased regulatory scrutiny as well as potential criminal and/or civil liability.

Accordingly, as described, the operators of electronic trading systems, alone or in conjunction with, or at the direction of, regulatory or industry organizations, typically publish or otherwise promulgate rules or regulations, referred to as business or operating rules, which govern the operation of the system. These rules define how, for example, multiple transactions are processed by the system where those transactions have relationships or dependencies there between which may affect the result of such processing. Such business rules may include, for example, order allocation rules, i.e., rules which dictate which of multiple competing resting orders will be matched with a particular incoming order counter thereto having insufficient quantity to fill all of the suitable resting orders. For example, under a first-in-first-out methodology, the first order, of the competing resting orders, that was received by the electronic trading system will be matched with the incoming counter-order and filled to the extent possible by the available quantity, with any residual quantity of the incoming counter order then being allocated to the next received suitable competing resting order and so on until the available quantity of the incoming counter order is exhausted. However, additional or alternative matching/allocation rules may be implemented as well, for example to ensure fair and equal access, improve trading opportunities, etc., by allocating, such as proportionally, the available quantity of the incoming counter order among all, or a subset, of the competing resting orders until the available quantity is exhausted.

Once such business rules are established, or modified, market participants will expect, and overseeing regulatory entities may require, that the electronic trading system operates in accordance therewith. That is, if the Exchange adopts a rule to give first arriving orders priority over later arriving orders, a market participant who submits an earlier arriving order will expect their order to be filled prior to a later arriving order submitted by another market participant. It will be appreciated that these rules, by which operators of an electronic trading system may choose to operate their system, may vary at the discretion of the operators, subject to regulatory concerns. Generally, the term "transactional determinism" may refer to the processing, or the appearance thereof, of orders in accordance with the defined business rules.

In addition to efficiency, fairness and equity, electronic trading systems further provide significant performance improvements allowing for rapid high volume transaction processing which benefits both the Exchange and market participants. Metrics of electronic trading system performance include latency and throughput. Latency may be measured as the response time of the Exchange. This can be measured in a number of different contexts: the time elapsed from when an order, or order cancelation, is received to when a confirmation/acknowledgment of receipt is transmitted, from when an order is received to when an execution notification is transmitted, or the time elapsed from when an order is received to information about that order being disseminated in the market data feed. Throughput may be measured as the maximum number of orders or trades per second that the electronic trading system can support, i.e., receive and acknowledge, receive and match, etc.

Generally, market participants desire rapid market data updates, low latency/high throughput order processing, and prompt confirmations of their instructions to allow them to: competitively, frequently and confidently evaluate, react to, and capitalize upon or, conversely, avoid, discrete, finite, fast moving/changing or ephemeral market events; leverage low return transactions via a high volume thereof; and/or otherwise coordinate, or synchronize their trading activities with other related concerns or activities, with less uncertainty with respect to their order status. Higher volume capacity and transaction processing performance provides these benefits as well as, without detrimentally affecting that capacity or performance, further improves market access and market liquidity, such as by allowing for participation by more market participants, the provision of additional financial products, and/or additional markets therefore, to meet the varying needs of the market participants, and rapid identification of additional explicit and implicit intra- and inter-market trading opportunities. The Exchange benefits, for example, from the increased transaction volume from which revenue is derived, e.g., via transaction fees.

Current electronic trading systems already offer significant performance advantages. However, increasing transaction volumes from an increasing number of market participants, implementation by some market participants of algorithmic and/or high frequency trading methodologies whereby high speed computers automatically monitor markets and react, usually in an overwhelming manner, to events, coupled with a continued demand for ever-decreasing processing latencies and response times, is driving a need for additional capacity and performance improvements to maintain performance as experienced by each market participant and avoid detrimental consequences, such as capacity exhaustion and inequitable access. For example, the increasing speed at which market participants may evaluate and respond to changes in market data, such as responsive to a market event, is increasing the rate at which transactions are received by the electronic trading system, narrowing the time of receipt gap there between and necessitating a need for a higher degree of discrimination so as to resolve the order in which those transactions are received, upon which the deterministic operation of the electronic trading system may be based, e.g. for order allocation, etc. Furthermore, the addition, by electronic trading systems, of additional channels of communication in an effort to increase capacity and opportunity, along with increased bandwidth of each channel, allows for more transactions to be submitted over multiple parallel paths into the system. Accordingly, not only must the electronic trading system discriminate among closely received incoming transactions, but must further arbitrate among transactions received simultaneously, or temporally so close together as to be considered simultaneously received, i.e., the difference in their time of receipt being too close to measure by the implemented discrimination mechanisms, also referred to as "substantially simultaneously".

In addition to increased capacity and lower latency, the global nature of business has further driven a need for fault tolerance to increase availability and reliability of electronic trading systems. Scheduled outages must be minimized and unscheduled outages must be eliminated.

Furthermore, to implement the Exchange's clearing function, which mitigates the concerns of market participants relating to performance by counter parties, protects the interests of the Exchange and otherwise adequately manages/mitigates risk, risk management systems having corresponding operational efficiency and performance are needed so as to protect the Exchange from loss while minimizing impediments to market operations or distractions to market participants with ancillary and unnecessary tasks. In addition, increased transaction volume may further translate into greater exposure for market participants requiring greater amounts of capital to be posted to cover losses. Accordingly, more accurate and/or tailored risk assessment may be required to ensure that only the necessary minimum amount of capital is required to be allocated by the market participants to cover potential losses and avoid undue encumbrances on/impediments to the ability of those market participants to conduct their business.

Improved speed and efficiency also increase the speed at which problems may occur and propagate, or otherwise be exploited, such as where the market ceases to operate as intended, i.e., the market no longer reflects a true consensus of the value of traded products among the market participants. Such problems are typically, but not always, evidenced by extreme market activity such as large changes in price, whether up or down, over a short period of time or an extreme volume of trades taking place. In particular, market participants, whether human or electronic, may not always react in a rational manner, such as when presented with imperfect information, when acting in fraudulent or otherwise unethical manner, and/or due to faulty training or design. For example, while communications technologies may have improved, inequities still exist in both access to information and access to opportunities to participate, which may not be due to any violations of legislative, regulatory and/or ethical rules, e.g. some traders receive information before other traders because they can afford faster communications channels, some traders may be able to place trade orders more quickly than others because they have faster computers. In many cases, irrational and/or exploitive trader behavior may be triggered by a market event, such as a change in price, creating a feedback loop where the initial irrational reaction may then cause further market events, such as continued price drops, triggering further responses and resulting in an extreme change in the price of the traded product in a short period of time. High speed trading exacerbates the problem as there may be little time for traders/algorithmic trading systems, or those overseeing them, to contemplate and temper their reactions before significant losses may be incurred. Furthermore, improved communications among traders facilitates exploitation of information inequities and propagation of irrational behavior in one market to other markets as traders in those other markets react to the results of the irrational behavior. Market protection systems may therefore be needed to monitor and evaluate trading activity, detect illegitimate/exploitive activity and appropriately react more quickly to mitigate the spread of problems, again without impeding legitimate market operation.

Spread Instruments

Traders trading on an exchange including, for example, exchange computer system 100, often desire to trade multiple financial instruments in combination. Each component of the combination may be called a leg. Traders can submit orders for individual legs or in some cases can submit a single order for multiple financial instruments in an exchange-defined combination. Such orders may be called a strategy order, a spread order, or a variety of other names.

A spread instrument may involve the simultaneous purchase of one security and sale of a related security, called legs, as a unit. The legs of a spread instrument may be options or futures contracts, or combinations of the two. Trades in spread instruments are executed to yield an overall net position whose value, called the spread, depends on the difference between the prices of the legs. Spread instruments may be traded in an attempt to profit from the widening or narrowing of the spread, rather than from movement in the prices of the legs directly. Spread instruments are either "bought" or "sold" depending on whether the trade will profit from the widening or narrowing of the spread, respectively. An exchange often supports trading of common spreads as a unit rather than as individual legs, thus ensuring simultaneous execution of the two legs, eliminating the execution risk of one leg executing but the other failing.

One example of a spread instrument is a calendar spread instrument. The legs of a calendar spread instrument differ in delivery date of the underlier. The leg with the earlier occurring delivery date is often referred to as the lead month contract. A leg with a later occurring delivery date is often referred to as a deferred month contract. Another example of a spread instrument is a butterfly spread instrument, which includes three legs having different delivery dates. The delivery dates of the legs may be equidistant to each other. The counterparty orders that are matched against such a combination order may be individual, "outright" orders or may be part of other combination orders.

In other words, an exchange may receive, and hold or let rest on the books, outright orders for individual contracts as well as outright orders for spreads associated with the individual contracts. An outright order (for either a contract or for a spread) may include an outright bid or an outright offer, although some outright orders may bundle many bids or offers into one message (often called a mass quote).

A spread is an order for the price difference between two contracts. This results in the trader holding a long and a short position in two or more related futures or options on futures contracts, with the objective of profiting from a change in the price relationship. A typical spread product includes multiple legs, each of which may include one or more underlying financial instruments. A butterfly spread product, for example, may include three legs. The first leg may consist of buying a first contract. The second leg may consist of selling two of a second contract. The third leg may consist of buying a third contract. The price of a butterfly spread product may be calculated as:

$$Butterfly=Leg1-2*Leg2+Leg3$$

In the above equation, Leg1 equals the price of the first contract, Leg2 equals the price of the second contract and Leg3 equals the price of the third contract. Thus, a butterfly spread could be assembled from two inter-delivery spreads in opposite directions with the center delivery month common to both spreads.

A calendar spread, also called an intra-commodity spread, for futures is an order for the simultaneous purchase and sale of the same futures contract in different contract months (i.e., buying a September CME S&P 500® futures contract and selling a December CME S&P 500 futures contract).

A crush spread is an order, usually in the soybean futures market, for the simultaneous purchase of soybean futures and the sale of soybean meal and soybean oil futures to establish a processing margin. A crack spread is an order for a specific spread trade involving simultaneously buying and selling contracts in crude oil and one or more derivative products, typically gasoline and heating oil. Oil refineries may trade a crack spread to hedge the price risk of their operations, while speculators attempt to profit from a change in the oil/gasoline price differential.

A straddle is an order for the purchase or sale of an equal number of puts and calls, with the same strike price and expiration dates. A long straddle is a straddle in which a long position is taken in both a put and a call option. A short straddle is a straddle in which a short position is taken in both a put and a call option. A strangle is an order for the purchase of a put and a call, in which the options have the same expiration and the put strike is lower than the call strike, called a long strangle. A strangle may also be the sale of a put and a call, in which the options have the same expiration and the put strike is lower than the call strike, called a short strangle. A pack is an order for the simultaneous purchase or sale of an equally weighted, consecutive series of four futures contracts, quoted on an average net change basis from the previous day's settlement price. Packs provide a readily available, widely accepted method for executing multiple futures contracts with a single transaction. A bundle is an order for the simultaneous sale or purchase of one of each of a series of consecutive futures contracts. Bundles provide a readily available, widely accepted method for executing multiple futures contracts with a single transaction.

Implication

Thus, an exchange may match outright orders, such as individual contracts or spread orders (which as discussed herein could include multiple individual contracts). The exchange may also imply orders from outright orders. For example, exchange computer system 100 may derive, identify and/or advertise, publish, display or otherwise make available for trading orders based on outright orders.

As was described above, the financial instruments which are the subject of the orders to trade may include one or more component financial instruments. While each financial instrument may have its own order book, i.e., market, in which it may be traded, in the case of a financial instrument having more than one component financial instrument, those component financial instruments may further have their own order books in which they may be traded. Accordingly, when an order for a financial instrument is received, it may be matched against a suitable counter order in its own order book or, possibly, against a combination of suitable counter orders in the order books the component financial instruments thereof, or which share a common component financial instrument. For example, an order for a spread contract comprising component financial instruments A and B may be matched against another suitable order for that spread contract. However, it may also be matched against suitable separate counter orders for the A and for the B component financial instruments found in the order books therefore. Similarly, if an order for the A contract is received and suitable match cannot be found in the A order book, it may be possible to match order for A against a combination of a suitable counter order for a spread contract comprising the A and B component financial instruments and a suitable counter order for the B component financial instrument. This is referred to as "implication" where a given order for a financial instrument may be matched via a combination of suitable counter orders for financial instruments which share common, or otherwise interdependent, component financial instruments. Implication increases the liquidity of the market by providing additional opportunities for orders to be traded. Increasing the number of transactions may further increase the number of transaction fees collected by the electronic trading system.

The order for a particular financial instrument actually received from a market participant, whether it comprises one or more component financial instruments, is referred to as a "real" or "outright" order, or simply as an outright. The one or more orders which must be synthesized and submitted into order books other than the order book for the outright order to create matches therein, are referred to as "implied" orders.

Upon receipt of an incoming order, the identification or derivation of suitable implied orders which would allow at least a partial trade of the incoming outright order to be executed is referred to as "implication" or "implied matching", the identified orders being referred to as an "implied match." Depending on the number of component financial instruments involved, and whether those component financial instruments further comprise component financial instruments of their own, there may be numerous different implied matches identified which would allow the incoming order to be at least partially matched and mechanisms may be provided to arbitrate, e.g., automatically, among them, such as by picking the implied match comprising the least number of component financial instruments or the least number of synthesized orders.

Upon receipt of an incoming order, or thereafter, a combination of one or more suitable/hypothetical counter orders which have not actually been received but if they were received, would allow at least a partial trade of the incoming order to be executed, may be, e.g., automatically, identified or derived and referred to as an "implied opportunity." As with implied matches, there may be numerous implied opportunities identified for a given incoming order. Implied opportunities are advertised to the market participants, such as via suitable synthetic orders, e.g. counter to the desired order, being placed on the respective order books to rest (or give the appearance that there is an order resting) and presented via the market data feed, electronically communicated to the market participants, to appear available to trade in order to solicit the desired orders from the market participants. Depending on the number of component financial instruments involved, and whether those component financial instruments further comprise component financial instruments of their own, there may be numerous implied opportunities, the submission of a counter order in response thereto, that would allow the incoming order to be at least partially matched.

Implied opportunities, e.g., the advertised synthetic orders, may frequently have better prices than the corresponding real orders in the same contract. This can occur when two or more traders incrementally improve their order prices in the hope of attracting a trade, since combining the small improvements from two or more real orders can result in a big improvement in their combination. In general, advertising implied opportunities at better prices will encourage traders to enter the opposing orders to trade with them. The more implied opportunities that the match engine of an electronic trading system can calculate/derive, the greater this encouragement will be and the more the exchange will benefit from increased transaction volume. However, identifying implied opportunities may be computationally intensive. One response message may trigger the calculations of hundreds or thousands of calculations to determine implied opportunities, which are then published, e.g., as implied messages, via market data feeds. In a high performance trading system where low transaction latency is important, it may be important to identify and advertise implied opportunities quickly so as to improve or maintain market participant interest and/or market liquidity.

For example, two different outright orders may be resting on the books, or be available to trade or match. The orders may be resting because there are no outright orders that match the resting orders. Thus, each of the orders may wait or rest on the books until an appropriate outright counter-offer comes into the exchange, or is placed by a user of the exchange. The orders may be for two different contracts that only differ in delivery dates. It should be appreciated that such orders could be represented as a calendar spread order. Instead of waiting for two appropriate outright orders to be received that would match the two existing or resting orders, the exchange computer system may identify a hypothetical spread order that, if entered into the system as a tradable spread order, would allow the exchange computer system to match the two outright orders. The exchange may thus advertise or make available a spread order to users of the exchange system that, if matched with a tradable spread order, would allow the exchange to also match the two resting orders. Thus, the exchange computing system may be configured to detect that the two resting orders may be combined into an order in the spread instrument and accordingly create an implied order.

In other words, the exchange may imply the counteroffer order by using multiple orders to create the counteroffer order. Examples of spreads include implied IN, implied OUT, 2nd- or multiple-generation, crack spreads, straddle, strangle, butterfly, and pack spreads. Implied IN spread orders are derived from existing outright orders in individual legs. Implied OUT outright orders are derived from a combination of an existing spread order and an existing outright order in one of the individual underlying legs. Implied orders can fill in gaps in the market and allow spreads and outright futures traders to trade in a product where there would otherwise have been little or no available bids and asks.

For example, implied IN spreads may be created from existing outright orders in individual contracts where an outright order in a spread can be matched with other outright orders in the spread or with a combination of orders in the legs of the spread. An implied OUT spread may be created from the combination of an existing outright order in a spread and an existing outright order in one of the individual underlying leg. An implied IN or implied OUT spread may be created when an electronic matching system simultaneously works synthetic spread orders in spread markets and synthetic orders in the individual leg markets without the risk to the trader/broker of being double filled or filled on one leg and not on the other leg.

By linking the spread and outright markets, implied spread trading increases market liquidity. For example, a buy in one contract month and an offer in another contract month in the same futures contract can create an implied market in the corresponding calendar spread. An exchange may match an order for a spread product with another order for the spread product. Some exchanges attempt to match orders for spread products with multiple orders for legs of the spread products. With such systems, every spread product contract is broken down into a collection of legs and an attempt is made to match orders for the legs.

Implied orders, unlike real orders, are generated by electronic trading systems. In other words, implied orders are computer generated orders derived from real orders. The system creates the "derived" or "implied" order and provides the implied order as a market that may be traded against. If a trader trades against this implied order, then the real orders that combined to create the implied order and the resulting market are executed as matched trades. Implied orders generally increase overall market liquidity. The creation of implied orders increases the number of tradable items, which has the potential of attracting additional traders. Exchanges benefit from increased transaction volume. Transaction volume may also increase as the number of matched trade items increases.

Examples of implied spread trading include those disclosed in U.S. Patent Publication No. 2005/0203826, entitled "Implied Spread Trading System," the entire disclosure of which is incorporated by reference herein and relied upon. Examples of implied markets include those disclosed in U.S. Pat. No. 7,039,610, entitled "Implied Market Trading System," the entire disclosure of which is incorporated by reference herein and relied upon.

In some cases, the outright market for the deferred month or other constituent contract may not be sufficiently active to provide market data (e.g., bid-offer data) and/or trade data. Spread instruments involving such contracts may nonetheless be made available by the exchange. The market data from the spread instruments may then be used to determine a settlement price for the constituent contract. The settlement price may be determined, for example, through a boundary constraint-based technique based on the market data (e.g., bid-offer data) for the spread instrument, as described in U.S. Patent Publication No. 2015/0073962 entitled "Boundary Constraint-Based Settlement in Spread Markets", the entire disclosure of which is incorporated by reference herein and relied upon. Settlement price determination techniques may be implemented to cover calendar month spread instruments having different deferred month contracts.

Referring again to data transaction processing systems, a system may depend on certain rules, logic, and inter-related objects and data. In technical and computing environments, a system may calculate values for multiple objects subject to rules, e.g., business or environment logic, associated with the objects. Certain object types may also depend on other object types. For example, a computing environment may include multiple objects of different types, e.g., base objects and composite objects. A composite object as used herein is an object whose value depends on, is related to, or is influenced by, the values of other objects, such as base objects or other composite objects. For example, a composite object may involve transactions between multiple, e.g., two, base objects. Or, a composite object may define a relationship between other objects. Thus, composite objects depend on the values of other system objects. In one embodiment, a composite object involves or defines a transaction or relationship between at least two other objects. For example, a composite object involves or defines a transaction or relationship between two base objects. A base object may represent an outright order associated with a financial instrument, and a composite object may represent a spread order associated with a financial instrument.

I. Computing Environment

The embodiments may be described in terms of a distributed computing system. The particular examples identify a specific set of components useful in a futures and options exchange. However, many of the components and inventive features are readily adapted to other electronic trading environments. The specific examples described herein may teach specific protocols and/or interfaces, although it should be understood that the principles involved may be extended to, or applied in, other protocols and interfaces.

It should be appreciated that the plurality of entities utilizing or involved with the disclosed embodiments, e.g., the market participants, may be referred to by other nomenclature reflecting the role that the particular entity is performing with respect to the disclosed embodiments and that a given entity may perform more than one role depending upon the implementation and the nature of the particular transaction being undertaken, as well as the entity's contractual and/or legal relationship with another market participant and/or the exchange.

An exemplary trading network environment for implementing trading systems and methods is shown in FIG. 1. An exchange computer system 100 receives messages that include orders and transmits market data related to orders and trades to users, such as via wide area network 162 and/or local area network 160 and computer devices 150, 152, 154, 156 and 158, as described herein, coupled with the exchange computer system 100.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

Figure 2:
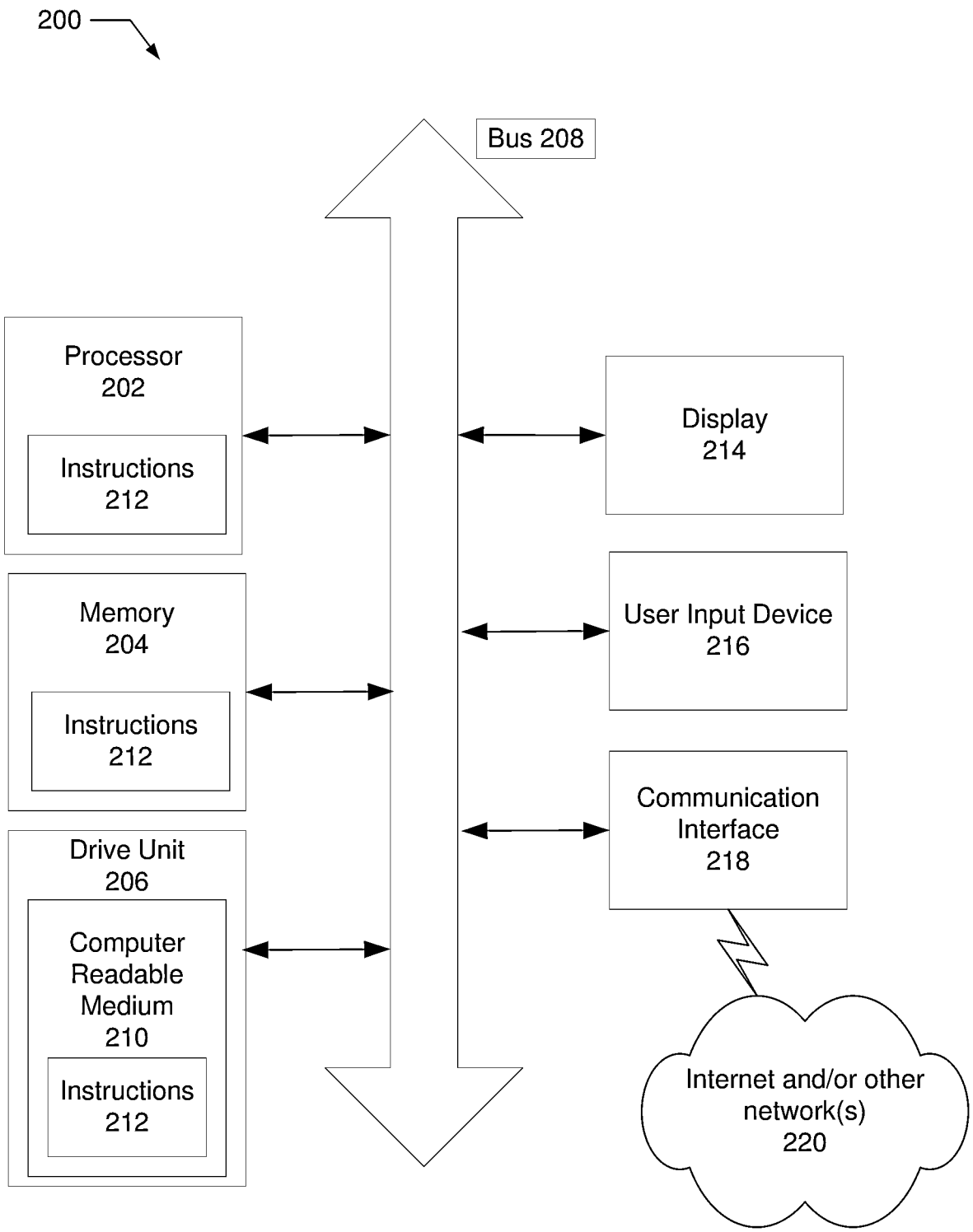
FIG. 2 depicts a general computer system, according to some embodiments.

The exchange computer system 100 may be implemented with one or more mainframe, desktop or other computers, such as the example computer 200 described herein with respect to FIG. 2. A user database 102 may be provided which includes information identifying traders and other users of exchange computer system 100, such as account numbers or identifiers, user names and passwords. An account data module 104 may be provided which may process account information that may be used during trades.

A match engine module 106 may be included to match bid and offer prices and may be implemented with software that executes one or more algorithms for matching bids and offers. A trade database 108 may be included to store information identifying trades and descriptions of trades. In particular, trade database 108 may store information identifying the time that a trade took place and the contract price. An order book module 110 may be included to compute or otherwise determine current bid and offer prices, e.g., in a continuous auction market, or also operate as an order accumulation buffer for a batch auction market.

A market data module 112 may be included to collect market data and prepare the data for transmission to users. For example, the market data module 112 may prepare the market data feeds described herein.

A risk management module 114 may be included to compute and determine a user's risk utilization in relation to the user's defined risk thresholds. The risk management module 114 may also be configured to determine risk assessments or exposure levels in connection with positions held by a market participant. The risk management module 114 may be configured to administer, manage or maintain one or more margining mechanisms implemented by the exchange computer system 100. Such administration, management or maintenance may include managing a number of database records reflective of margin accounts of the market participants. In some embodiments, the risk management module 114 implements one or more aspects of the disclosed embodiments, including, for instance, principal component analysis (PCA) based margining, in connection with interest rate swap (IRS) portfolios.

A message management module 116 may be included to, among other things, receive, and extract orders from, electronic data transaction request messages. The message management module 116 may define a point of ingress into the exchange computer system 100 where messages are ordered and considered to be received by the system. This may be considered a point of determinism in the exchange computer system 100 that defines the earliest point where the system can ascribe an order of receipt to arriving messages. The point of determinism may or may not be at or near the demarcation point between the exchange computer system 100 and a public/internet network infrastructure. The message management module 116 processes messages by interpreting the contents of a message based on the message transmit protocol, such as the transmission control protocol ("TCP"), to provide the content of the message for further processing by the exchange computer system.

The message management module 116 may also be configured to detect characteristics of an order for a transaction to be undertaken in an electronic marketplace. For example, the message management module 116 may identify and extract order content such as a price, product, volume, and associated market participant for an order. The message management module 116 may also identify and extract data indicating an action to be executed by the exchange computer system 100 with respect to the extracted order. For example, the message management module 116 may determine the transaction type of the transaction requested in a given message. A message may include an instruction to perform a type of transaction. The transaction type may be, in one embodiment, a request/offer/order to either buy or sell a specified quantity or units of a financial instrument at a specified price or value. The message management module 116 may also identify and extract other order information and other actions associated with the extracted order. All extracted order characteristics, other information, and associated actions extracted from a message for an order may be collectively considered an order as described and referenced herein.

Order or message characteristics may include, for example, the state of the system after a message is received, arrival time (e.g., the time a message arrives at the MSG or Market Segment Gateway), message type (e.g., new, modify, cancel), and the number of matches generated by a message. Order or message characteristics may also include market participant side (e.g., buyer or seller) or time in force (e.g., a good until end of day order that is good for the full trading day, a good until canceled ordered that rests on the order book until matched, or a fill or kill order that is canceled if not filled immediately, or a fill and kill order (FOK) that is filled to the maximum amount possible based on the state of the order book at the time the FOK order is processed, and any remaining or unfilled/unsatisfied quantity is not stored on the books or allowed to rest).

An order processing module 118 may be included to decompose delta-based, spread instrument, bulk and other types of composite orders for processing by the order book module 110 and/or the match engine module 106. The order processing module 118 may also be used to implement one or more procedures related to clearing an order. The order may be communicated from the message management module 116 to the order processing module 118. The order processing module 118 may be configured to interpret the communicated order, and manage the order characteristics, other information, and associated actions as they are processed through an order book module 110 and eventually transacted on an electronic market. For example, the order processing module 118 may store the order characteristics and other content and execute the associated actions. In an embodiment, the order processing module 118 may execute an associated action of placing the order into an order book for an electronic trading system managed by the order book module 110. In an embodiment, placing an order into an order book and/or into an electronic trading system may be considered a primary action for an order. The order processing module 118 may be configured in various arrangements, and may be configured as part of the order book module 110, part of the message management module 116, or as an independent functioning module.

As an intermediary to electronic trading transactions, the exchange bears a certain amount of risk in each transaction that takes place. To that end, the clearing house implements risk management mechanisms to protect the exchange. One or more of the modules of the exchange computer system 100 may be configured to determine settlement prices for constituent contracts, such as deferred month contracts, of spread instruments, such as for example, settlement module 120. A settlement module 120 (or settlement processor or other payment processor) may be included to provide one or more functions related to settling or otherwise administering transactions cleared by the exchange. Settlement module 120 of the exchange computer system 100 may implement one or more settlement price determination techniques. Settlement-related functions need not be limited to actions or events occurring at the end of a contract term. For instance, in some embodiments, settlement-related functions may include or involve daily or other mark to market settlements for margining purposes. In some cases, the settlement module 120 may be configured to communicate with the trade database 108 (or the memory(ies) on which the trade database 108 is stored) and/or to determine a payment amount based on a spot price, the price of the futures contract or other financial instrument, or other price data, at various times. The determination may be made at one or more points in time during the term of the financial instrument in connection with a margining mechanism. For example, the settlement module 120 may be used to determine a mark to market amount on a daily basis during the term of the financial instrument. Such determinations may also be made on a settlement date for the financial instrument for the purposes of final settlement.

In some embodiments, the settlement module 120 may be integrated to any desired extent with one or more of the other modules or processors of the exchange computer system 100. For example, the settlement module 120 and the risk management module 114 may be integrated to any desired extent. In some cases, one or more margining procedures or other aspects of the margining mechanism(s) may be implemented by the settlement module 120.

A clearinghouse module 122 may be included as part of exchange computer system 100 and configured to carry out clearinghouse operations. Clearinghouse module 122 may receive data from and/or transmit data to trade database 108 and/or other modules of computer system 100 regarding trades of OTC FX forwards, futures contracts, futures contracts options, OTC options and contracts, and other financial products. Clearinghouse module 122 may facilitate the financial product exchange computing system 100 acting as one of the parties to every traded contract or other product. For example, computer system 100 may match an offer by party A to sell a financial product with a bid by party B to purchase a like financial product. Clearinghouse module 122 may then create a financial product between party A and the exchange and an offsetting second financial product between the exchange and party B. As another example, module 122 may maintain margin data with regard to clearing members and/or trading customers. As part of such margin-related operations, module 122 may store and maintain data regarding the values of various contracts and other instruments, determine mark-to-market and final settlement amounts, confirm receipt and/or payment of amounts due from margin accounts, confirm satisfaction of final settlement obligations (physical or cash), etc. As discussed in further detail below, module 122 may compress the size of an exchange traded derivatives portfolio.

One or more of the above-described modules of the exchange computer system 100 may be used to gather or obtain data to support the settlement price determination, as well as a subsequent margin requirement determination. For example, the order book module 110 and/or the market data module 112 may be used to receive, access, or otherwise obtain market data, such as bid-offer values of orders currently on the order books. The trade database 108 may be used to receive, access, or otherwise obtain trade data indicative of the prices and volumes of trades that were recently executed in a number of markets. In some cases, transaction data (and/or bid/ask data) may be gathered or obtained from open outcry pits and/or other sources and incorporated into the trade and market data from the electronic trading system(s). It should be appreciated that concurrent processing limits may be defined by or imposed separately or in combination on one or more of the trading system components.

The disclosed mechanisms may be implemented at any logical and/or physical point(s), or combinations thereof, at which the relevant information/data (e.g., message traffic and responses thereto) may be monitored or flows or is otherwise accessible or measurable, including one or more gateway devices, modems, the computers or terminals of one or more market participants, e.g., client computers, etc.

One skilled in the art will appreciate that one or more modules described herein may be implemented using, among other things, a tangible computer-readable medium comprising computer-executable instructions (e.g., executable software code). Alternatively, modules may be implemented as software code, firmware code, specifically configured hardware or processors, and/or a combination of the aforementioned. For example, the modules may be embodied as part of an exchange 100 for financial instruments. It should be appreciated the disclosed embodiments may be implemented as a different or separate module of the exchange computer system 100, or a separate computer system coupled with the exchange computer system 100 so as to have access to margin account record, pricing, and/or other data. As described herein, the disclosed embodiments may be implemented as a centrally accessible system or as a distributed system, e.g., where some of the disclosed functions are performed by the computer systems of the market participants.

The trading network environment shown in FIG. 1 includes exemplary computer devices 150, 152, 154, 156 and 158 which depict different exemplary methods or media by which a computer device may be coupled with the exchange computer system 100 or by which a user may communicate, e.g., send and receive, trade or other information therewith. It should be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 200 described in more detail with respect to FIG. 2, may include a central processor, specifically configured or otherwise, that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An exemplary computer device 150 is shown directly connected to exchange computer system 100, such as via a T1 line, a common local area network (LAN) or other wired and/or wireless medium for connecting computer devices, such as the network 220 shown in FIG. 2 and described with respect thereto. The exemplary computer device 150 is further shown connected to a radio 168. The user of radio 168, which may include a cellular telephone, smart phone, or other wireless proprietary and/or non-proprietary device, may be a trader or exchange employee. The radio user may transmit orders or other information to the exemplary computer device 150 or a user thereof. The user of the exemplary computer device 150, or the exemplary computer device 150 alone and/or autonomously, may then transmit the trade or other information to the exchange computer system 100.

Exemplary computer devices 152 and 154 are coupled with a local area network ("LAN") 160 which may be configured in one or more of the well-known LAN topologies, e.g., star, daisy chain, etc., and may use a variety of different protocols, such as Ethernet, TCP/IP, etc. The exemplary computer devices 152 and 154 may communicate with each other and with other computers and other devices which are coupled with the LAN 160. Computer and other devices may be coupled with the LAN 160 via twisted pair wires, coaxial cable, fiber optics or other wired or wireless media. As shown in FIG. 1, an exemplary wireless personal digital assistant device ("PDA") 158, such as a mobile telephone, tablet based compute device, or other wireless device, may communicate with the LAN 160 and/or the Internet 162 via radio waves, such as via WiFi, Bluetooth and/or a cellular telephone based data communications protocol. PDA 158 may also communicate with exchange computer system 100 via a conventional wireless hub 164.

FIG. 1 also shows the LAN 160 coupled with a wide area network ("WAN") 162 which may be comprised of one or more public or private wired or wireless networks. In one embodiment, the WAN 162 includes the Internet 162. The LAN 160 may include a router to connect LAN 160 to the Internet 162. Exemplary computer device 156 is shown coupled directly to the Internet 162, such as via a modem, DSL line, satellite dish or any other device for connecting a computer device to the Internet 162 via a service provider therefore as is known. LAN 160 and/or WAN 162 may be the same as the network 220 shown in FIG. 2 and described with respect thereto.

Users of the exchange computer system 100 may include one or more market makers 166 which may maintain a market by providing constant bid and offer prices for a derivative or security to the exchange computer system 100, such as via one of the exemplary computer devices depicted. The exchange computer system 100 may also exchange information with other match or trade engines, such as trade engine 170. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on a non-transitory computer-readable medium. For example, the exemplary computer device 152 may store computer-executable instructions for receiving order information from a user, transmitting that order information to exchange computer system 100 in electronic messages, extracting the order information from the electronic messages, executing actions relating to the messages, and/or calculating values from characteristics of the extracted order to facilitate matching orders and executing trades. In another example, the exemplary computer device 154 may include computer-executable instructions for receiving market data from exchange computer system 100 and displaying that information to a user.

Numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may include other components not shown and be connected by numerous alternative topologies.

Referring now to FIG. 2, an illustrative embodiment of a general computer system 200 is shown. The computer system 200 can include a set of instructions that can be executed to cause the computer system 200 to perform any one or more of the methods or computer based functions disclosed herein. The computer system 200 may operate as a standalone device or may be connected, e.g., using a network, to other computer systems or peripheral devices. Any of the components discussed herein, such as processor 202, may be a computer system 200 or a component in the computer system 200. The computer system 200 may be specifically configured to implement a match engine, margin processing, payment or clearing function on behalf of an exchange, such as the Chicago Mercantile Exchange, of which the disclosed embodiments are a component thereof.

In a networked deployment, the computer system 200 may operate in the capacity of a server or as a client user computer in a client-server user network environment, or as a peer computer system in a peer-to-peer (or distributed) network environment. The computer system 200 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 200 can be implemented using electronic devices that provide voice, video or data communication. Further, while a single computer system 200 is illustrated, the term "system" shall also be taken to include any collection of systems or sub-systems that individually or jointly execute a set, or multiple sets, of instructions to perform one or more computer functions.

As illustrated in FIG. 2, the computer system 200 may include a processor 202, e.g., a central processing unit (CPU), a graphics processing unit (GPU), or both. The processor 202 may be a component in a variety of systems. For example, the processor 202 may be part of a standard personal computer or a workstation. The processor 202 may be one or more general processors, digital signal processors, specifically configured processors, application specific integrated circuits, field programmable gate arrays, servers, networks, digital circuits, analog circuits, combinations thereof, or other now known or later developed devices for analyzing and processing data. The processor 202 may implement a software program, such as code generated manually (i.e., programmed).

The computer system 200 may include a memory 204 that can communicate via a bus 208. The memory 204 may be a main memory, a static memory, or a dynamic memory. The memory 204 may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 204 includes a cache or random access memory for the processor 202. In alternative embodiments, the memory 204 is separate from the processor 202, such as a cache memory of a processor, the system memory, or other memory. The memory 204 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 204 is operable to store instructions executable by the processor 202. The functions, acts or tasks illustrated in the figures or described herein may be performed by the programmed processor 202 executing the instructions 212 stored in the memory 204. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 200 may further include a display unit 214, such as a liquid crystal display (LCD), an organic light emitting diode (OLED), a flat panel display, a solid state display, a cathode ray tube (CRT), a projector, a printer or other now known or later developed display device for outputting determined information. The display 214 may act as an interface for the user to see the functioning of the processor 202, or specifically as an interface with the software stored in the memory 204 or in the drive unit 206.

Additionally, the computer system 200 may include an input device 216 configured to allow a user to interact with any of the components of system 200. The input device 216 may be a number pad, a keyboard, or a cursor control device, such as a mouse, or a joystick, touch screen display, remote control or any other device operative to interact with the system 200.

In a particular embodiment, as depicted in FIG. 2, the computer system 200 may also include a disk or optical drive unit 206. The disk drive unit 206 may include a computer-readable medium 210 in which one or more sets of instructions 212, e.g., software, can be embedded. Further, the instructions 212 may embody one or more of the methods or logic as described herein. In a particular embodiment, the instructions 212 may reside completely, or at least partially, within the memory 204 and/or within the processor 202 during execution by the computer system 200. The memory 204 and the processor 202 also may include computer-readable media as discussed herein.

The present disclosure contemplates a computer-readable medium that includes instructions 212 or receives and executes instructions 212 responsive to a propagated signal, so that a device connected to a network 220 can communicate voice, video, audio, images or any other data over the network 220. Further, the instructions 212 may be transmitted or received over the network 220 via a communication interface 218. The communication interface 218 may be a part of the processor 202 or may be a separate component. The communication interface 218 may be created in software or may be a physical connection in hardware. The communication interface 218 is configured to connect with a network 220, external media, the display 214, or any other components in system 200, or combinations thereof. The connection with the network 220 may be a physical connection, such as a wired Ethernet connection or may be established wirelessly. Likewise, the additional connections with other components of the system 200 may be physical connections or may be established wirelessly.

The network 220 may include wired networks, wireless networks, or combinations thereof. The wireless network may be a cellular telephone network, an 802.11, 802.16, 802.20, or WiMax network. Further, the network 220 may be a public network, such as the Internet, a private network, such as an intranet, or combinations thereof, and may utilize a variety of networking protocols now available or later developed including, but not limited to, TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated or otherwise specifically configured hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

As used herein, the terms "microprocessor" or "general-purpose processor" ("GPP") may refer to a hardware device that fetches instructions and data from a memory or storage device and executes those instructions (for example, an Intel Xeon processor or an AMD Opteron processor) to then, for example, process the data in accordance therewith. The term "reconfigurable logic" may refer to any logic technology whose form and function can be significantly altered (i.e., reconfigured) in the field post-manufacture as opposed to a microprocessor, whose function can change post-manufacture, e.g. via computer executable software code, but whose form, e.g. the arrangement/layout and interconnection of logical structures, is fixed at manufacture. The term "software" may refer to data processing functionality that is deployed on a GPP. The term "firmware" may refer to data processing functionality that is deployed on reconfigurable logic. One example of a reconfigurable logic is a field programmable gate array ("FPGA") which is a reconfigurable integrated circuit. An FPGA may contain programmable logic components called "logic blocks", and a hierarchy of reconfigurable interconnects that allow the blocks to be "wired together", somewhat like many (changeable) logic gates that can be inter-wired in (many) different configurations. Logic blocks may be configured to perform complex combinatorial functions, or merely simple logic gates like AND, OR, NOT and XOR. An FPGA may further include memory elements, which may be simple flip-flops or more complete blocks of memory.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well. Feedback provided to the user can be any form of sensory feedback, e.g., visual feedback, auditory feedback, or tactile feedback. Input from the user can be received in any form, including acoustic, speech, or tactile input.

Embodiments of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

It should be appreciated that the disclosed embodiments may be applicable to other types of messages depending upon the implementation. Further, the messages may comprise one or more data packets, datagrams or other collection of data formatted, arranged configured and/or packaged in a particular one or more protocols, e.g., the FIX protocol, TCP/IP, Ethernet, etc., suitable for transmission via a network 214 as was described, such as the message format and/or protocols described in U.S. Pat. No. 7,831,491 and U.S. Patent Publication No. 2005/0096999 A1, both of which are incorporated by reference herein in their entireties and relied upon. Further, the disclosed message management system may be implemented using an open message standard implementation, such as FIX, FIX Binary, FIX/FAST, or by an exchange-provided API.

The embodiments described herein may utilize trade related electronic messages such as mass quote messages, individual order messages, modification messages, cancellation messages, etc., so as to enact trading activity in an electronic market. The trading entity and/or market participant may have one or multiple trading terminals associated with the session. Furthermore, the financial instruments may be financial derivative products. Derivative products may include futures contracts, options on futures contracts, futures contracts that are functions of or related to other futures contracts, swaps, swaptions, or other financial instruments that have their price related to or derived from an underlying product, security, commodity, equity, index, or interest rate product. In one embodiment, the orders are for options contracts that belong to a common option class. Orders may also be for baskets, quadrants, other combinations of financial instruments, etc. The option contracts may have a plurality of strike prices and/or comprise put and call contracts. A mass quote message may be received at an exchange. As used herein, an exchange computing system 100 includes a place or system that receives and/or executes orders.

In an embodiment, a plurality of electronic messages is received from the network. The plurality of electronic messages may be received at a network interface for the electronic trading system. The plurality of electronic messages may be sent from market participants. The plurality of messages may include order characteristics and be associated with actions to be executed with respect to an order that may be extracted from the order characteristics. The action may involve any action associated with transacting the order in an electronic trading system. The actions may involve placing the orders within a particular market and/or order book of a market in the electronic trading system.

In an embodiment, an incoming transaction may be received. The incoming transaction may be from, and therefore associated with, a market participant of an electronic market managed by an electronic trading system. The transaction may involve an order as extracted from a received message, and may have an associated action. The actions may involve placing an order to buy or sell a financial product in the electronic market, or modifying or deleting such an order. In an embodiment, the financial product may be based on an associated financial instrument which the electronic market is established to trade.

In an embodiment, the action associated with the transaction is determined. For example, it may be determined whether the incoming transaction comprises an order to buy or sell a quantity of the associated financial instrument or an order to modify or cancel an existing order in the electronic market. Orders to buy or sell and orders to modify or cancel may be acted upon differently by the electronic market. For example, data indicative of different characteristics of the types of orders may be stored.

In an embodiment, data relating to the received transaction is stored. The data may be stored in any device, or using any technique, operable to store and provide recovery of data. For example, a memory 204 or computer readable medium 210, may be used to store data, as is described with respect to FIG. 2 in further detail herein. Data may be stored relating to received transactions for a period of time, indefinitely, or for a rolling most recent time period such that the stored data is indicative of the market participant's recent activity in the electronic market.

If and/or when a transaction is determined to be an order to modify or cancel a previously placed, or existing, order, data indicative of these actions may be stored. For example, data indicative of a running count of a number or frequency of the receipt of modify or cancel orders from the market participant may be stored. A number may be a total number of modify or cancel orders received from the market participant, or a number of modify or cancel orders received from the market participant over a specified time. A frequency may be a time based frequency, as in a number of cancel or modify orders per unit of time, or a number of cancel or modify orders received from the market participant as a percentage of total transactions received from the participant, which may or may not be limited by a specified length of time.

If and/or when a transaction is determined to be an order to buy or sell a financial product, or financial instrument, other indicative data may be stored. For example, data indicative of quantity and associated price of the order to buy or sell may be stored.

Data indicative of attempts to match incoming orders may also be stored. The data may be stored in any device, or using any technique, operable to store and provide recovery of data. For example, a memory 204 or computer readable medium 210, may be used to store data, as is described with respect to FIG. 2. The acts of the process as described herein may also be repeated. As such, data for multiple received transactions for multiple market participants may be stored and used as described herein.

The order processing module 118 may also store data indicative of characteristics of the extracted orders. For example, the order processing module may store data indicative of orders having an associated modify or cancel action, such as by recording a count of the number of such orders associated with particular market participants. The order processing module may also store data indicative of quantities and associated prices of orders to buy or sell a product placed in the market order book 110, as associated with particular market participants.

Also, the order processing module 118 may be configured to calculate and associate with particular orders a value indicative of an associated market participant's market activity quality, which is a value indicative of whether the market participant's market activity increases or tends to increase liquidity of a market. This value may be determined based on the price of the particular order, previously stored quantities of orders from the associated market participant, the previously stored data indicative of previously received orders to modify or cancel as associated with the market participant, and previously stored data indicative of a result of the attempt to match previously received orders stored in association with the market participant. The order processing module 118 may determine or otherwise calculate scores indicative of the quality value based on these stored extracted order characteristics.

Further, electronic trading systems may perform actions on orders placed from received messages based on various characteristics of the messages and/or market participants associated with the messages. These actions may include matching the orders either during a continuous auction process, or at the conclusion of a collection period during a batch auction process. The matching of orders may be by any technique.

The matching of orders may occur based on a priority indicated by the characteristics of orders and market participants associated with the orders. Orders having a higher priority may be matched before orders of a lower priority. Such priority may be determined using various techniques. For example, orders that were indicated by messages received earlier may receive a higher priority to match than orders that were indicated by messages received later. Also, scoring or grading of the characteristics may provide for priority determination. Data indicative of order matches may be stored by a match engine and/or an order processing module 118. ORDER BOOK OBJECT DATA STRUCTURES In one embodiment, the messages and/or values received for each object may be stored in queues according to value and/or priority techniques implemented by an exchange computing system 100. FIG. 3A illustrates an example data structure 300, which may be stored in a memory or other storage device, such as the memory 204 or storage device 206 described with respect to FIG. 2, for storing and retrieving messages related to different values for the same action for an object. For example, data structure 300 may be a set of queues or linked lists for multiple values for an action, e.g., bid, on an object. Data structure 300 may be implemented as a database. It should be appreciated that the system may store multiple values for the same action for an object, for example, because multiple users submitted messages to buy specified quantities of an object at different values. Thus, in one embodiment, the exchange computing system may keep track of different orders or messages for buying or selling quantities of objects at specified values.

Although the present application contemplates using queue data structures for storing messages in a memory, the implementation may involve additional pointers, i.e., memory address pointers, or linking to other data structures. Incoming messages may be stored at an identifiable memory address. The transaction processor can traverse messages in order by pointing to and retrieving different messages from the different memories. Thus, messages that may be depicted sequentially, e.g., in FIG. 3B below, may actually be stored in memory in disparate locations. The software programs implementing the transaction processing may retrieve and process messages in sequence from the various disparate (e.g., random) locations. Thus, in one embodiment, each queue may store different values, which could represent prices, where each value points to or is linked to the messages (which may themselves be stored in queues and sequenced according to priority techniques, such as prioritizing by value) that will match at that value. For example, as shown in FIG. 3A, all of the values relevant to executing an action at different values for an object are stored in a queue. Each value in turn points to, e.g., a linked list or queue logically associated with the values. The linked list stores the messages that instruct the exchange computing system to buy specified quantities of the object at the corresponding value.

The sequence of the messages in the message queues connected to each value may be determined by exchange implemented priority techniques. For example, in FIG. 3A, messages M1, M2, M3 and M4 are associated with performing an action (e.g., buying or selling) a certain number of units (may be different for each message) at Value 1. M1 has priority over M2, which has priority over M3, which has priority over M4. Thus, if a counter order matches at Value 1, the system fills as much quantity as possible associated with M1 first, then M2, then M3, and then M4.

In the illustrated examples, the values may be stored in sequential order, and the best or lead value for a given queue may be readily retrievable by and/or accessible to the disclosed system. Thus, in one embodiment, the value having the best priority may be illustrated as being in the topmost position in a queue, although the system may be configured to place the best priority message in some other predetermined position. In the example of FIG. 3A, Value 1 is shown as being the best value or lead value, or the top of the book value, for an example Action.

A lead acquisition value may be the best or lead value in an acquisition queue of an order book object, and a lead relinquish value may be the best or lead value in a relinquish queue of the order book object.

Figure 3B:
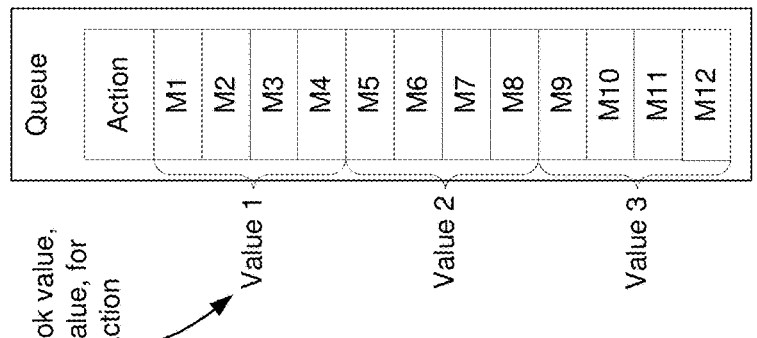
FIGS. 3A to 3C depict various storage data structures, according to some embodiments.
Figure 3A:
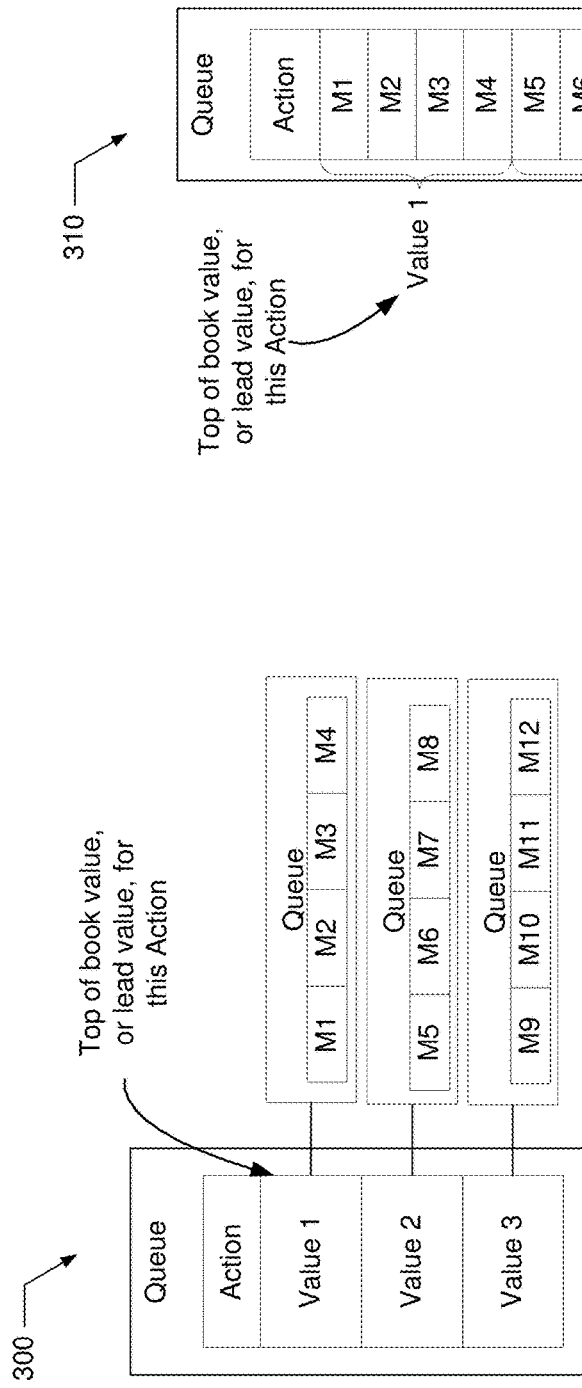

FIG. 3B illustrates an example alternative data structure 310 for storing and retrieving messages and related values. It should be appreciated that matches occur based on values, and so all the messages related to a given value may be prioritized over all other messages related to a different value. As shown in FIG. 3B, the messages may be stored in one queue and grouped by values according to the hierarchy of the values. The hierarchy of the values may depend on the action to be performed.

For example, if a queue is a sell queue (e.g., the Action is Sell), the lowest value may be given the best priority and the highest value may be given the lowest priority. Thus, as shown in FIG. 3B, if Value 1 is lower than Value 2 which is lower than Value 3, Value 1 messages may be prioritized over Value 2, which in turn may be prioritized over Value 3.

Within Value 1, M1 is prioritized over M2, which in turn is prioritized over M3, which in turn is prioritized over M4. Within Value 2, M5 is prioritized over M6, which in turn is prioritized over M7, which in turn is prioritized over M8. Within Value 3, M9 is prioritized over M10, which in turn is prioritized over M11, which in turn is prioritized over M12.

Alternatively, the messages may be stored in a tree-node data structure that defines the priorities of the messages. In one embodiment, the messages may make up the nodes.

In one embodiment, the system may traverse through a number of different values and associated messages when processing an incoming message. Traversing values may involve the processor loading each value, checking that value and deciding whether to load another value, i.e., by accessing the address pointed at by the address pointer value. In particular, referring to FIG. 3B, if the queue is for selling an object for the listed Values 1, 2 and 3 (where Value 1 is lower than Value 2 which is lower than Value 3), and if the system receives an incoming aggressing order to buy quantity X at a Value 4 that is greater than Values 1, 2, and 3, the system will fill as much of quantity X as possible by first traversing through the messages under Value 1 (in sequence M1, M2, M3, M4). If any of the quantity of X remains, the system traverses down the prioritized queue until all of the incoming order is filled (e.g., all of X is matched) or until all of the quantities of M1 through M12 are filled. Any remaining, unmatched quantity remains on the books, e.g., as a resting order at Value 4, which was the entered value or the message's value.

The system may traverse the queues and check the values in a queue, and upon finding the appropriate value, may locate the messages involved in making that value available to the system. When an outright message value is stored in a queue, and when that outright message is involved in a trade or match, the system may check the queue for the value, and then may check the data structure storing messages associated with that value.

In one embodiment, an exchange computing system may convert all financial instruments to objects. In one embodiment, an object may represent the order book for a financial instrument. Moreover, in one embodiment, an object may be defined by two queues, one queue for each action that can be performed by a user on the object. For example, an order book converted to an object may be represented by an Ask queue and a Bid queue. Resting messages or orders associated with the respective financial instrument may be stored in the appropriate queue and recalled therefrom.

In one embodiment, the messages associated with objects may be stored in specific ways depending on the characteristics of the various messages and the states of the various objects in memory. For example, a system may hold certain resting messages in queue until the message is to be processed, e.g., the message is involved in a match. The order, sequence or priority given to messages may depend on the characteristics of the message. For example, in certain environments, messages may indicate an action that a computer in the system should perform. Actions may be complementary actions, or require more than one message to complete. For example, a system may be tasked with matching messages or actions contained within messages. The messages that are not matched may be queued by the system in a data queue or other structure, e.g., a data tree having nodes representing messages or orders.

The queues are structured so that the messages are stored in sequence according to priority. Although the embodiments are disclosed as being implemented in queues, it should be understood that different data structures such as, for example linked lists or trees may also be used.

The system may include separate data structures, e.g., queues, for different actions associated with different objects within the system. For example, in one embodiment, the system may include a queue for each possible action that can be performed on an object. The action may be associated with a value. The system prioritizes the actions based in part on the associated value.

Figure 3C:
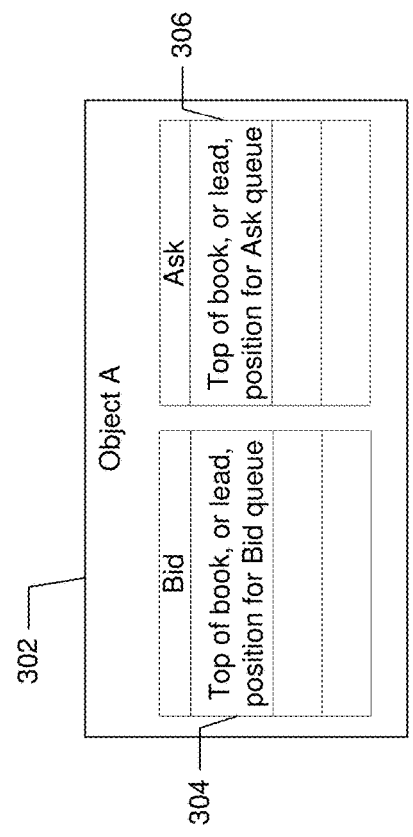

For example, as shown in FIG. 3C, the order book module of a computing system may include several paired queues, such as queues Bid and Ask for an object 302 (e.g., Object A). The system may include two queues, or one pair of queues, for each object that is matched or processed by the system. In one embodiment, the system stores messages in the queues that have not yet been matched or processed. FIG. 3C may be an implementation of the data structures disclosed in FIGS. 3A and/or 3B. Each queue may have a top of book, or lead, position, such as positions 304 and 306, which stores data that is retrievable.

The queues may define the priority or sequence in which messages are processed upon a match event. For example, two messages stored in a queue may represent performing the same action at the same value. When a third message is received by the system that represents a matching action at the same value, the system may need to select one of the two waiting, or resting, messages as the message to use for a match. Thus, when multiple messages can be matched at the same value, the exchange may have a choice or some flexibility regarding the message that is matched. The queues may define the priority in which orders that are otherwise equivalent (e.g., same action for the same object at the same value) are processed.

The system may include a pair of queues for each object, e.g., a bid and ask queue for each object. Each queue may be, for example, implemented utilizing the data structure of FIG. 3B. The exchange may be able to specify the conditions upon which a message for an object should be placed in a queue. For example, the system may include one queue for each possible action that can be performed on an object. The system may be configured to process messages that match with each other. In one embodiment, a message that indicates performing an action at a value may match with a message indicating performing a corresponding action at the same value. Or, the system may determine the existence of a match when messages for the same value exist in both queues of the same object. The messages may be received from the same or different users or traders.

The queues illustrated in FIG. 3C hold or store messages received by a computing exchange, e.g., messages submitted by a user to the computing exchange, and wait for a proper match. It should be appreciated that the queues may also hold or store implieds, e.g., implied messages generated by the exchange system, such as messages implied in or implied out as described herein. The system thus adds messages to the queues as they are received, e.g., messages submitted by users, or generated, e.g., implied messages generated by the exchanges. The sequence or prioritization of messages in the queues is based on information about the messages and the overall state of the various objects in the system.

When the data transaction processing system is implemented as an exchange computing system, as discussed above, different client computers submit electronic data transaction request messages to the exchange computing system. Electronic data transaction request messages include requests to perform a transaction on a data object, e.g., at a value for a quantity. The exchange computing system includes a transaction processor, e.g., a hardware matching processor or match engine, that matches, or attempts to match, pairs of messages with each other. For example, messages may match if they contain counter instructions (e.g., one message includes instructions to buy, the other message includes instructions to sell) for the same product at the same value. In some cases, depending on the nature of the message, the value at which a match occurs may be the submitted value or a better value. A better value may mean a higher or lower value depending on the specific transaction requested. For example, a buy order may match at the submitted buy value or a lower (e.g., better) value. A sell order may match at the submitted sell value or a higher (e.g., better) value.

Transaction Processor Data Structures

Figure 4:
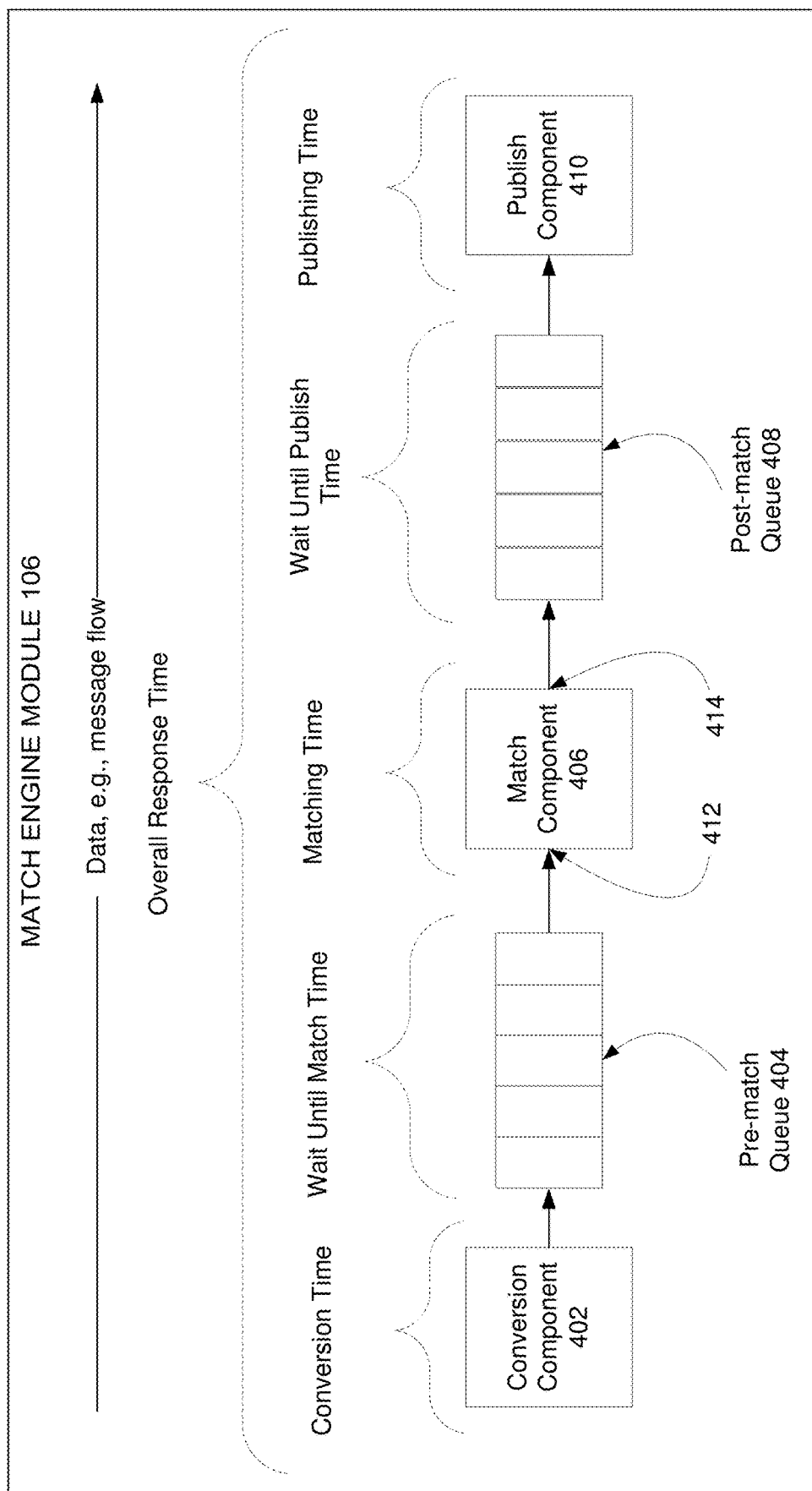
FIG. 4 depicts a match engine module, according to some embodiments.

FIG. 4 illustrates an example embodiment of a data structure used to implement match engine module 106. Match engine module 106 may include a conversion component 402, pre-match queue 404, match component 406, post-match queue 408 and publish component 410.

Although the embodiments are disclosed as being implemented in queues, it should be understood that different data structures, such as for example linked lists or trees, may also be used. Although the application contemplates using queue data structures for storing messages in a memory, the implementation may involve additional pointers, i.e., memory address pointers, or linking to other data structures. Thus, in one embodiment, each incoming message may be stored at an identifiable memory address. The transaction processing components can traverse messages in order by pointing to and retrieving different messages from the different memories. Thus, messages that may be processed sequentially in queues may actually be stored in memory in disparate locations. The software programs implementing the transaction processing may retrieve and process messages in sequence from the various disparate (e.g., random) locations.

The queues described herein may, in one embodiment, be structured so that the messages are stored in sequence according to time of receipt, e.g., they may be first in first out (FIFO) queues.

The match engine module 106 may be an example of a transaction processing system. The pre-match queue 404 may be an example of a pre-transaction queue. The match component 406 may be an example of a transaction component. The post-match queue 408 may be an example of a post-transaction queue. The publish component 410 may be an example of a distribution component. The transaction component may process messages and generate transaction component results.

It should be appreciated that match engine module 106 may not include all of the components described herein. For example, match engine module 106 may only include pre-match queue 404 and match component 406. In one embodiment, the latency detection system may detect how long a message waits in a pre-match queue 404 (e.g., latency), and compares the latency to the maximum allowable latency associated with the message.

In one embodiment, the publish component may be a distribution component that can distribute data to one or more market participant computers. In one embodiment, match engine module 106 operates according to a first in, first out (FIFO) ordering. The conversion component 402 converts or extracts a message received from a trader via the Market Segment Gateway or MSG into a message format that can be input into the pre-match queue 404.

Messages from the pre-match queue may enter the match component 406 sequentially and may be processed sequentially. In one regard, the pre-transaction queue, e.g., the pre-match queue, may be considered to be a buffer or waiting spot for messages before they can enter and be processed by the transaction component, e.g., the match component. The match component matches orders, and the time a message spends being processed by the match component can vary, depending on the contents of the message and resting orders on the book. Thus, newly received messages wait in the pre-transaction queue until the match component is ready to process those messages. Moreover, messages are received and processed sequentially or in a first-in, first-out (FIFO) methodology. The first message that enters the pre-match or pre-transaction queue will be the first message to exit the pre-match queue and enter the match component. In one embodiment, there is no out-of-order message processing for messages received by the transaction processing system. The pre-match and post-match queues are, in one embodiment, fixed in size, and any messages received when the queues are full may need to wait outside the transaction processing system or be re-sent to the transaction processing system.

The match component 406 processes an order or message, at which point the transaction processing system may consider the order or message as having been processed. The match component 406 may generate one message or more than one message, depending on whether an incoming order was successfully matched by the match component. An order message that matches against a resting order in the order book may generate dozens or hundreds of messages. For example, a large incoming order may match against several smaller resting orders at the same price level. For example, if many orders match due to a new order message, the match engine needs to send out multiple messages informing traders which resting orders have matched. Or, an order message may not match any resting order and only generates an acknowledgement message. Thus, the match component 406 in one embodiment will generate at least one message, but may generate more messages, depending upon the activities occurring in the match component. For example, the more orders that are matched due to a given message being processed by the match component, the more time may be needed to process that message. Other messages behind that given message will have to wait in the pre-match queue.

Messages resulting from matches in the match component 406 enter the post-match queue 408. The post-match queue may be similar in functionality and structure to the pre-match queue discussed above, e.g., the post-match queue is a FIFO queue of fixed size. As illustrated in FIG. 4, a difference between the pre- and post-match queues may be the location and contents of the structures, namely, the pre-match queue stores messages that are waiting to be processed, whereas the post-match queue stores match component results due to matching by the match component. The match component receives messages from the pre-match queue, and sends match component results to the post-match queue. In one embodiment, the time that results messages, generated due to the transaction processing of a given message, spend in the post-match queue is not included in the latency calculation for the given message.

Messages from the post-match queue 408 enter the publish component 410 sequentially and are published via the MSG sequentially. Thus, the messages in the post-match queue 408 are an effect or result of the messages that were previously in the pre-match queue 404. In other words, messages that are in the pre-match queue 404 at any given time will have an impact on or affect the contents of the post-match queue 408, depending on the events that occur in the match component 406 once the messages in the pre-match queue 404 enter the match component 406.

As noted above, the match engine module 106 in one embodiment operates in a first in first out (FIFO) scheme. In other words, the first message that enters the match engine module 106 is the first message that is processed by the match engine module 106. Thus, the match engine module 106 in one embodiment processes messages in the order the messages are received. In FIG. 4, as shown by the data flow arrow, data is processed sequentially by the illustrated structures from left to right, beginning at the conversion component 402, to the pre-match queue, to the match component 406, to the post-match queue 408, and to the publish component 410. The overall transaction processing system operates in a FIFO scheme such that data flows from element 402 to 404 to 406 to 408 to 410, in that order. If any one of the queues or components of the transaction processing system experiences a delay, that creates a backlog for the structures preceding the delayed structure. For example, if the match or transaction component is undergoing a high processing volume, and if the pre-match or pre-transaction queue is full of messages waiting to enter the match or transaction component, the conversion component may not be able to add any more messages to the pre-match or pre-transaction queue.

Messages wait in the pre-match queue. The time a message waits in the pre-match queue depends upon how many messages are ahead of that message (i.e., earlier messages), and how much time each of the earlier messages spends being serviced or processed by the match component. Messages also wait in the post-match queue. The time a message waits in the post-match queue depends upon how many messages are ahead of that message (i.e., earlier messages), and how much time each of the earlier messages spends being serviced or processed by the publish component. These wait times may be viewed as a latency that can affect a market participant's trading strategy.

After a message is published (after being processed by the components and/or queues of the match engine module), e.g., via a market data feed, the message becomes public information and is publicly viewable and accessible. Traders consuming such published messages may act upon those messages, e.g., submit additional new input messages to the exchange computing system responsive to the published messages.

The match component attempts to match aggressing or incoming orders against resting orders. If an aggressing order does not match any resting orders, then the aggressing order may become a resting order, or an order resting on the books. For example, if a message includes a new order that is specified to have a one-year time in force, and the new order does not match any existing resting order, the new order will essentially become a resting order to be matched (or attempted to be matched) with some future aggressing order. The new order will then remain on the books for one year. On the other hand, an order specified as a fill or kill (e.g., if the order cannot be filled or matched with an order currently resting on the books, the order should be canceled) will never become a resting order, because it will either be filled or matched with a currently resting order, or it will be canceled. The amount of time needed to process or service a message once that message has entered the match component may be referred to as a service time. The service time for a message may depend on the state of the order books when the message enters the match component, as well as the contents, e.g., orders, that are in the message.

In one embodiment, orders in a message are considered to be "locked in", or processed, or committed, upon reaching and entering the match component. If the terms of the aggressing order match a resting order when the aggressing order enters the match component, then the aggressing order will be in one embodiment guaranteed to match.

As noted above, the latency experienced by a message, or the amount of time a message spends waiting to enter the match component, depends upon how many messages are ahead of that message (i.e., earlier messages), and how much time each of the earlier messages spends being serviced or processed by the match component. The amount of time a match component spends processing, matching or attempting to match a message depends upon the type of message, or the characteristics of the message. The time spent inside the processor may be considered to be a service time, e.g., the amount of time a message spends being processed or serviced by the processor.

The number of matches or fills that may be generated in response to a new order message for a financial instrument will depend on the state of the data object representing the electronic marketplace for the financial instrument. The state of the match engine can change based on the contents of incoming messages.

It should be appreciated that the match engine's overall latency is in part a result of the match engine processing the messages it receives. The match component's service time may be a function of the message type (e.g., new, modify, cancel), message arrival rate (e.g., how many orders or messages is the match engine module receiving, e.g., messages per second), message arrival time (e.g., the time a message hits the inbound MSG or market segment gateway), number of fills generated (e.g., how many fills were generated due to a given message, or how many orders matched due to an aggressing or received order), or number of Mass Quote entries (e.g., how many of the entries request a mass quote).

In one embodiment, the time a message spends: being converted in the conversion component 402 may be referred to as a conversion time; waiting in the pre-match queue 404 may be referred to as a wait until match time; being processed or serviced in the match component 406 may be referred to as a matching time; waiting in the post-match queue 408 may be referred to as a wait until publish time; and being processed or published via the publish component 410 may be referred to as a publishing time.

It should be appreciated that the latency may be calculated, in one embodiment, as the sum of the conversion time and wait until match time. Or, the system may calculate latency as the sum of the conversion time, wait until match time, matching time, wait until publish time, and publishing time. In systems where some or all of those times are negligible, or consistent, a measured latency may only include the sum of some of those times. Or, a system may be designed to only calculate one of the times that is the most variable, or that dominates (e.g., percentage wise) the overall latency. For example, some market participants may only care about how long a newly sent message that is added to the end of the pre-match queue will spend waiting in the pre-match queue. Other market participants may care about how long that market participant will have to wait to receive an acknowledgement from the match engine that a message has entered the match component. Yet other market participants may care about how much time will pass from when a message is sent to the match engine's conversion component to when match component results exit or egress from the publish component.

Data File Optimization

As described above, an exchange computing system may store portfolios of open positions, specifically, post-trade/post-match positions, for hundreds or thousands of clients, or market participants, in various data files. The positions are each the result of a trade match event, where an incoming order matches a resting order (e.g., resting in the order book), and which are defined by the terms of the match. The portfolios may include many different financial instruments/exchange traded derivates that are listed by the exchange computing system and/or cleared by the exchange computing system. The exchange computing system may implement one or more computing systems (e.g., servers, data repositories, processors, etc.) that may be used, at least in part, to store or otherwise manage the data files of portfolios. The more data elements (or line items, where each line item is an open position) in the portfolio data file, the greater the strain on the exchange computing system, and the greater the computing resources necessary to house, manage, and process the portfolio data files. This may include managing and/or processing information associated with the portfolios.

Traders often use models that determine the risks associated with their portfolios. Models used by traders often produce values that reflect the portfolio's sensitivity to changes in predefined variables, such as delta, gamma, and vega. Traders adjust their portfolios, e.g., by entering into trades, based on the risks defined by the predefined variables, and not on the number of line items in the portfolio. Moreover, regulations may require traders to include certain positions in a portfolio even if the positions do not change the risk profile of the portfolio. Traders may accordingly hold many positions in a portfolio that are a by-product of trading strategies or regulations. These practices have resulted in a strain on computer systems used to process and trade financial instruments.

As portfolios become larger for one or more of the exchange computing system's clients, the data storage capacity and/or processing power necessary to process and/or store this information may approach a storage capacity and/or processing power limit of the currently installed hardware. As such, the exchange computing system may be required to install more computing devices and/or upgrade existing computing components to handle the additional information storage and/or processing requirements.

It should be appreciated that some portfolios may include hundreds or thousands of line items, each line item represented as a data element. As described above, an increase in the number of financial instruments in a portfolio (e.g., an increase in the data elements) increases the overall amount of computing resources (e.g., bandwidth, networking systems) necessary to manage the portfolio, and also generally degrades performance of the computer system.

Many of these positions may be positions that naturally offset each other, such as a long (buy) and short (sell) position in the same financial instrument. To clarify the meaning of naturally offsetting positions, for example, if a first portfolio includes a long position and a short position of the same contract/financial instrument, the long position and short position naturally offset each other. However, if a portfolio includes a long and short position in two financial instruments, as well as a position in a spread instrument between the two financial instruments, then the three financial instruments may not naturally offset each other even if considered altogether, the three financial instruments have a zero overall risk.

Some existing systems detect derivatives products on opposite sides of the market within a portfolio and automatically compress such contracts into a reduced number of line items (e.g., a single line item, two line items, three line items, etc.) within the same contract and maturity date. Further, one or more OTC algorithms may be used to compress line items within the same maturity date. Other systems attempt to identify opportunities to reduce the gross notional outstanding of exchange traded derivatives and the technology overhead generated from the reporting process, such as by reducing the amount of data and/or subsequent computing processes required to store the trades associated with one or more large portfolios.

Some systems offer margin offset based on whether a portfolio includes offsetting positions in correlated products. For example, an exchange computing system may reduce a trader's margin requirement by a certain percentage if the trader's portfolio includes correlated products. However, exchange computing system margin offsetting systems do not actually remove positions/line items from a portfolio. Instead, the overall margin requirement is reduced. Accordingly, existing exchange computing systems can offer customers margin efficiency without reducing line items.

Existing systems do not adequately account for compression opportunities in portfolios where there is not a natural netting of positions, e.g., where some of the positions have related risk characteristics but where those positions do not exactly or naturally offset each other. These types of portfolios exist as described above as a by-product of traders adjusting their positions based on variables such as delta, vega and gamma, because this type of adjustment may be more efficient for market participants than removing existing positions. To exit positions, a trader would have to enter into an offsetting trade, which would incur a transaction cost for executing the new offsetting trade. Additionally, submitting additional orders/electronic data transaction request messages for execution would incur additional computational costs for both the traders as well as the exchange computing system which processes the trades. It should be appreciated that from a trader's perspective, it is not efficient to exit post-trade positions by executing additional trades. Because each change to a portfolio may be associated with transactional financial costs as well as computational costs, a portfolio stored by the exchange computing system may have positions that, when considered together, have zero overall risk.

Or, these types of portfolios may exist when a market maker places large numbers of bids, asks, and related spreads which result in matches with a market taker's orders. These portfolios include positions that do not naturally offset, but nevertheless include positions that economically offset each other, or are flat from a risk perspective. For certain markets, the exchange computing system offers packages that traders can enter into, such as a spread position as well as the individual legs underlying that spread position.

For example, in some markets, such as the energy market, trading strategies may dictate that a trader enters into a spread position, and also into positions underlying that spread. Such strategies result in a portfolio including a large number of related positions, where each position triggers the computing and financial burdens described above.

For example, the exchange computing system 100 may list energy products Singapore Fuel Oil 380 cst (Platts) (trading symbol SE) and European 3.5% Fuel Oil (trading symbol UV). Exchange computing system 100 may also list an energy spread product Singapore Fuel Oil vs European 3.5% Fuel Oil (trading symbol EVC). A financial institution, market participant or exchange computing system member may employ a trading strategy that results in purchasing/selling all three of the contracts SE, UV and EVC. A portfolio resulting from the trading strategy may include the following three positions: long 30 SE, short 30 EVC, and short 30 UV. It should be appreciated that the portfolio's overall risk is flat, because any movement of price of any one of the positions is balanced out or offset by counter movements in the other positions.

However, the open interest remains on the books, which leads to regulatory capital requirements. Again, open interest is the position on the market after a trade has matched. Basel III standardized capital models require exchange traded derivatives products, futures and options on futures, be capitalized on a "gross basis". The "gross basis" approach may require certain financial institutions, e.g., banks, who trade with the exchange computing system to aggregate positions irrespective of the risk or offsetting nature of the positions, both in the proprietary account and when providing customers clearing services. Accordingly, a portfolio may be subject to regulatory capital requirements even though the overall risk associated with the portfolio is essentially zero. A capital requirement is the amount of capital a bank or other financial institution has to hold as required by financial regulators, such as the US Commodity Futures Trading Commission, the Federal Reserve System, or Office of the Comptroller of the Currency.

As such, clearing firms may allocate more capital than is necessary to account for the risk. Further, in doing so, excess computing power may be used to support the large number of positions and to determine capital requirements, resulting in networking inefficiency and/or causing increased computing requirement costs in maintaining and upgrading servers and other network computing assets. This not only results in a burdensome and inefficient amount of line items that have to be processed, but also is extremely inefficient from a capital perspective (i.e., the amount of money a market participant must set aside, per financial regulations).

By optimizing the size of one or more portfolio data files, the exchange computing system may be able to proactively manage the computing requirements and the associated costs of storing, processing, and/or transmitting the one or more portfolios, as well as reduce associated capital requirements.

Unnecessarily high capital requirements can limit the amount of trading activity of a market participant in several ways. Market participants have a limit on how much capital can be set aside for capital requirements. As such, minimizing the size of portfolio data files, which can reduce capital requirements, can be beneficial for traders as it allows them to increase their participation and activity in the markets. In some cases, a Futures Commissions Merchant or a clearing member may impose a capital limit on the capital that a trader can utilize.

Figure 5:
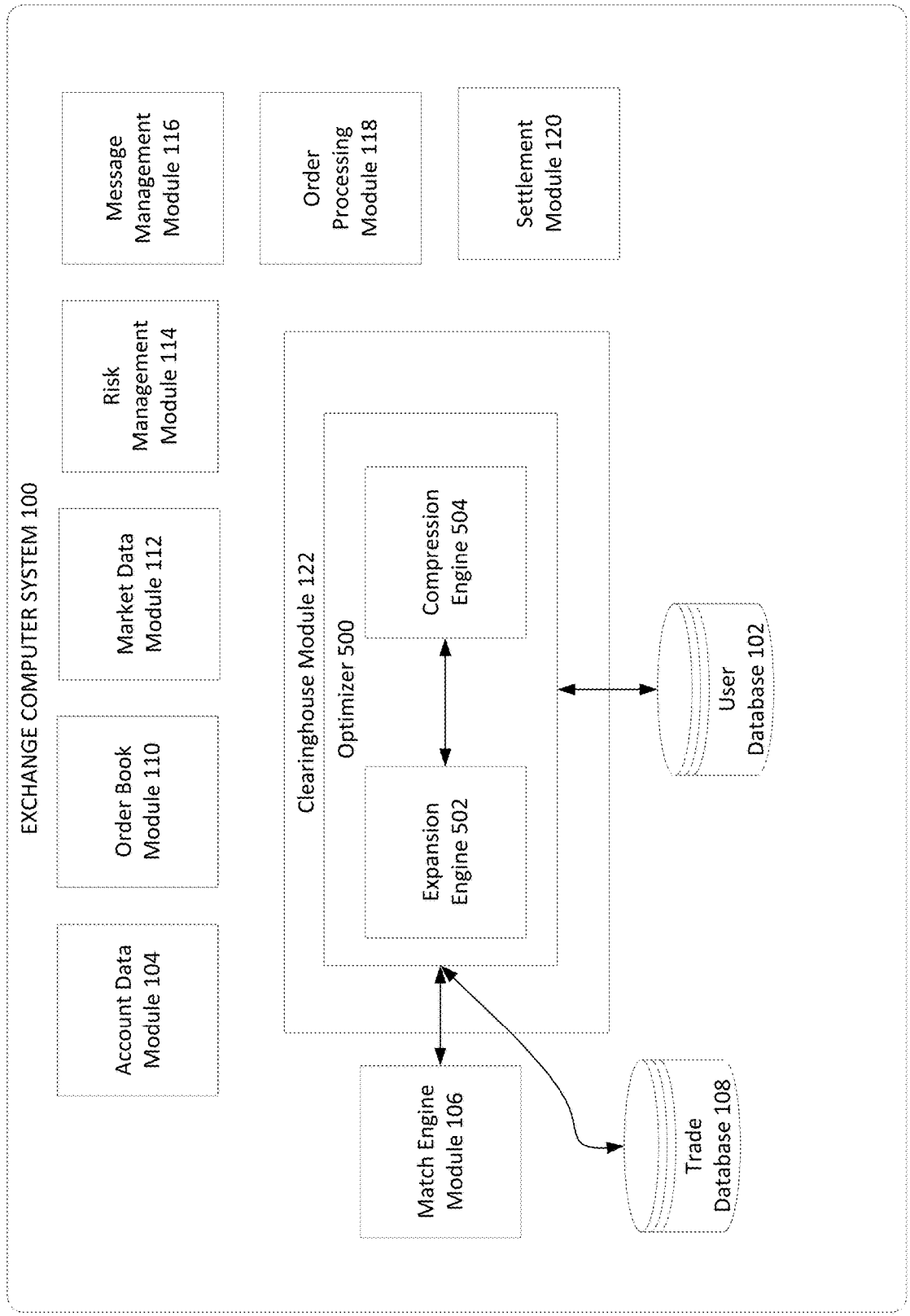
FIG. 5 depicts a block diagram of an exchange computing system including an optimization system, according to some embodiments.

Referring now to FIG. 5, there are depicted aspects of a system architecture in a block-diagram form and data flow between and among various system components for operation of an exchange computing system 100 including a system 500 for optimizing the size of a data file in accordance with one embodiment. The data file may represent a portfolio, and may include data elements that correspond to line items or open positions in the portfolio.

Clearinghouse module 122 of exchange computing system 100 includes optimizer 500, which optimizes the size of the data file. Optimizer 500 includes an expansion engine 502, which may be implemented as a separate component or as one or more logic components, such as on an FPGA which may include a memory or reconfigurable component to store logic and a processing component to execute the stored logic, e.g. computer program logic, stored in a memory, such as the memory 204 shown in FIG. 2 and described in more detail above with respect thereto, or other non-transitory computer readable medium, and executable by a processor, such as the processor 202 shown in FIG. 2 and described in more detail above with respect thereto, to cause the processor to receive a data file including a plurality of data elements, and to expand the data file by generating additional data elements based on the data elements included in the received data file.

For example, the optimizer receives a portfolio of exchange traded derivatives, e.g., from the match engine module 106, and/or trade database 108, where the portfolio includes post-trade/post-match positions associated with a market participant. The expansion engine 502 may be configured to communicate with the user database 102, which includes more information about the market participant, and which may be used to determine whether positions are associated with a same common market participant.

In one embodiment, the optimizer 500 processes a portfolio based on user preferences, which are stored in the user database 102. For example, a market participant may select specific financial instruments (e.g., a spread and its underlying legs) that, if present in the market participant's portfolio (e.g., the market participant's portfolio includes positions for those selected specific financial instruments), may be removed as discussed herein by the optimizer 500. Alternatively, a user may authorize the exchange computing system to algorithmically search for opportunities to compress data elements, including searching for positions in the portfolio that do not naturally offset each other but when considered together have an overall economic risk of zero, e.g., the optimizer automatically searches a portfolio for a spread position comprising two financial instruments if the same portfolio also includes positions in the two underlying legs. Accordingly, the type and extent of the compression that is performed by optimizer 500 may be based on user preferences stored in user database 102 which is communicatively coupled to optimizer 500. The user preferences and settings may be specified via a user interface of a user trading device, e.g., device 150.

In one embodiment, a trader may elect to optimize his or her derivatives portfolio via a user interface coupled to a trader computer system. Before a trader submits his or her portfolio to the clearing house of the exchange computing system, the trader may indicate, via the user interface, that the exchange computing system should process the portfolio through the optimizer. Upon receiving a portfolio that is marked as a portfolio that should be optimized, the exchange computing system automatically optimizes the portfolio as discussed herein.

Figure 6A:
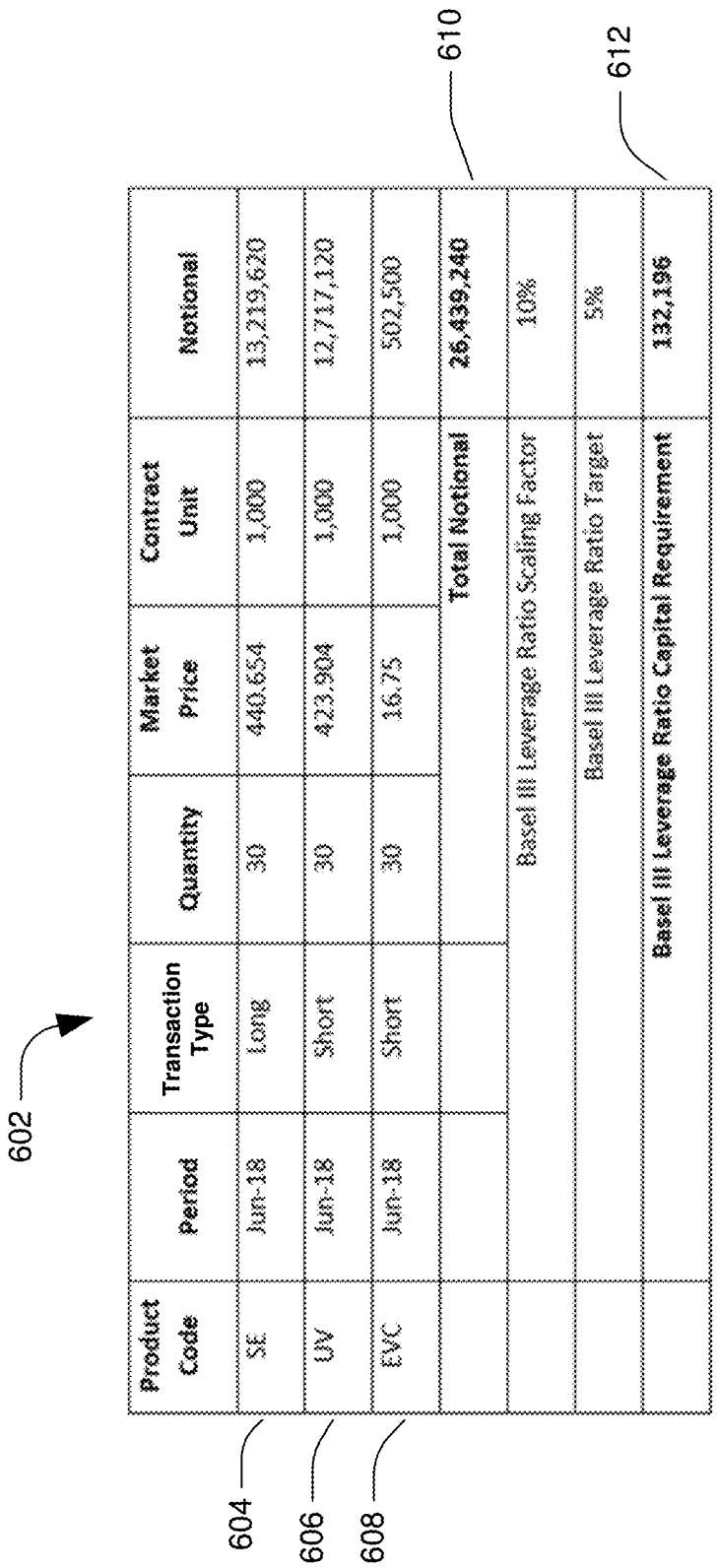
FIGS. 6A and 6B illustrate example exchange traded derivative portfolios, according to some embodiments.

The expansion engine 502 identifies spread positions in the portfolio and replaces each spread position with the legs underlying the spread position. FIG. 6A illustrates portfolio 602 including three different entries or positions 604 (long 30 SE), 606 (short 30 UV) and 608 (short 30 EVC). Portfolio 602 may be associated with a total notional amount 610 of $26,439,240, and a capital requirement 612 of $132,196. Although portfolio 602 is illustrated as having only three positions for exemplary purposes, it should be appreciated that portfolio 602 may include hundreds or thousands of positions or line items, where many of the line items may be eliminated implementing the techniques described herein.

Figure 6B:
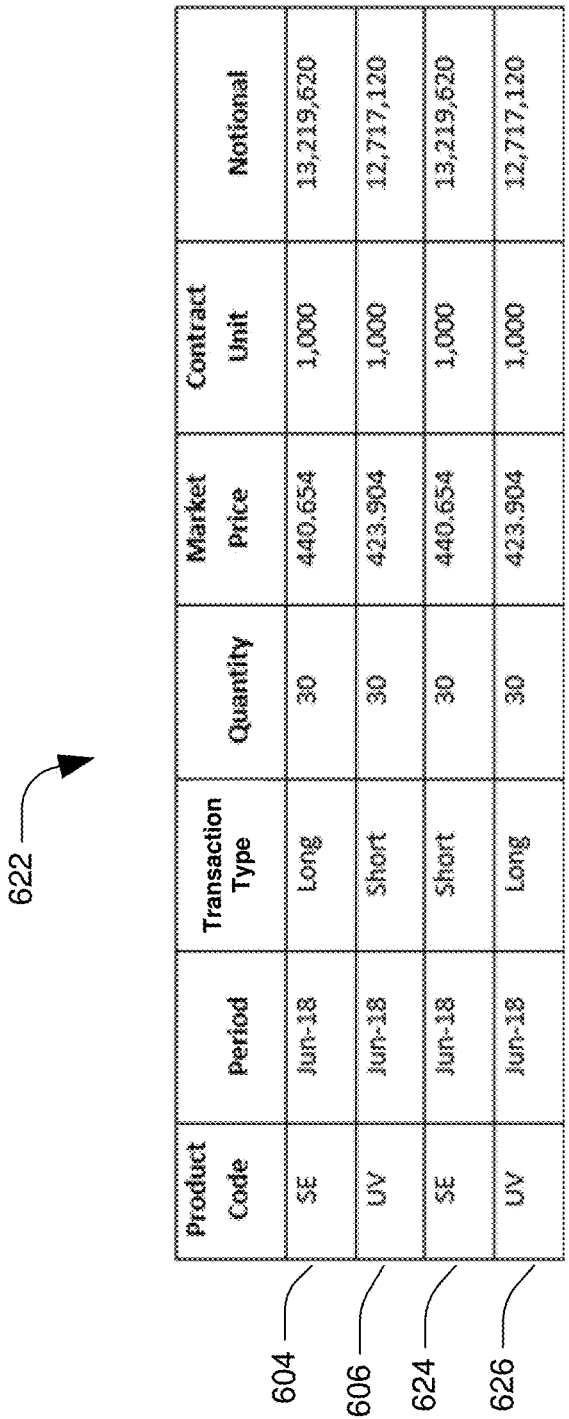

FIG. 6B illustrates portfolio 622, which is the result of processing of portfolio 602 by expansion engine 502. Portfolio 622 includes more line items than portfolio 602, and in particular, includes four line items. Line items 604 and 606 in portfolio 622 are the same as line items 604 and 606 in portfolio 602. However, in portfolio 662, expansion engine 502 has replaced line item 608 (from portfolio 602) with two new line items, namely, line items 624 and 626. In particular, the spread position 608 has been replaced by new positions 624 and 626, which are the legs underlying position item 608.

Referring back to FIG. 5, optimizer 500 includes compression engine 504, which may be implemented as a separate component or as one or more logic components, such as on an FPGA which may include a memory or reconfigurable component to store logic and a processing component to execute the stored logic, e.g. computer program logic, stored in a memory, such as the memory 204 shown in FIG. 2 and described in more detail above with respect thereto, or other non-transitory computer readable medium, and executable by a processor, such as the processor 202 shown in FIG. 2 and described in more detail above with respect thereto, to cause the processor to compress the size of the data file by reducing the number of data elements in the data file received from the expansion engine 502.

Compression engine 504 receives portfolio 622 from the expansion engine 502. Compression engine 504 performs a process where positions that are counter to each other or that offset each other are deleted from the data file associated with portfolio 622. For example, referring back to FIG. 6B, in portfolio 622, line item 604 would be offset by line item 624, and line item 606 would be offset by line item 626, resulting in a reduction of line items/data elements, and thus reducing the file size of the data file associated with portfolio 622. Again, although portfolio 622 is shown as having only four line items, portfolio 622 may include hundreds or thousands of data elements, which would be eligible for compression by the compression engine 504.

Optimizer 500 may generate a new data file based on an existing data file after each step performed by optimizer 500. For example, as described in the above examples, portfolio 602 is deleted and portfolio 622 is generated after the expansion step performed by the expansion engine 502. In one embodiment, the optimizer 500 may directly add and remove line items from a data file defining a portfolio. For example, instead of the expansion engine 502 generating a new data file/portfolio 622 based on data file/portfolio 602, the expansion engine 502 may directly insert new data elements into the same data file/portfolio 602.

It should be appreciated that the optimizer 500 accordingly is configured to temporarily expand/increase the size of a portfolio data file, before compressing/reducing the size of the portfolio data file. The result of processing portfolio 622 is that the entire portfolio is deleted from memory. If portfolio 622 contained other data elements that did not offset each other, the portfolio 622 would be smaller in size after being compressed by compression engine 504, but would not be completely deleted.

The optimizer 500 may be implemented before or after attempting to compress a portfolio using other known techniques/algorithms. In one embodiment, the exchange computing system may perform other known compression techniques before optimizing the portfolio as described by optimizer 500.

The disclosed optimizer reduces the number of line items/positions/data elements in a portfolio, thereby reducing capital inefficiencies (e.g., the capital requirement 612 which is high compared to the overall risk of positions 604, 606 and 608 considered together of essentially zero) as well as the unnecessary utilization of computing resources required to manage/store/transmit a large portfolio data file.

The disclosed embodiments enable the exchange computing system to offer customers both margin requirement efficiency as well as capital requirement efficiency by compressing the portfolio as discussed herein. In addition, the data file containing the portfolio is compressed, enabling computational performance improvements (e.g., fewer computing resources required to maintain, manage, and transmit the data file).

It should be appreciated that the specific products/financial instruments discussed here are for exemplary purposes only, and may be replaced with other financial instruments. For example, the exchange computing system 100 may list energy products WTI Financial Futures (trading symbol CS) and Brent Financial Futures (trading symbol CY). Exchange computing system 100 may also list an energy spread product WTI—Brent Fin. Futures (trading symbol BK).

A financial institution, market participant or exchange computing system member may employ a trading strategy that results in purchasing/selling all three of the contracts CS, CY and BK, and a portfolio resulting from the trading strategy may include positions in the three contracts. The disclosed embodiments may be implemented, as discussed herein, to reduce the size of a portfolio data file including data elements for those positions.

In one embodiment, optimizer 500 may optimize a derivatives portfolio automatically. For example, a market participant may transmit a data file including a plurality of data elements to the exchange computing system 100. The exchange computing system 100 may automatically process the portfolio implementing the disclosed optimizer. For example, the optimizer 500 may expand the portfolio by generating multiple new data elements. The new data elements may replace some of the original data elements in the portfolio. It should be appreciated that due to the expansion engine of the optimizer, the size of the portfolio/data file is increased. The expanded portfolio is then compressed by the optimizer 500 by identifying offsetting positions. The specific situations and circumstances controlling whether positions offset each other may be defined by an administrator or operator of the exchange computing system, or alternatively by a trader/market participant. For example, two positions may offset each other if they are counter transactions (e.g., one buy and one sell) for the same quantity of a financial instrument. Whether a market participant, or the exchange computing system, considers that positions are offsettable may be based on criteria, and even positions that are not exact opposites of each other may be considered offsettable. The exchange computing system automatically compresses the portfolio and determines the capital regulatory requirements based on the compressed portfolio.

Figure 7:
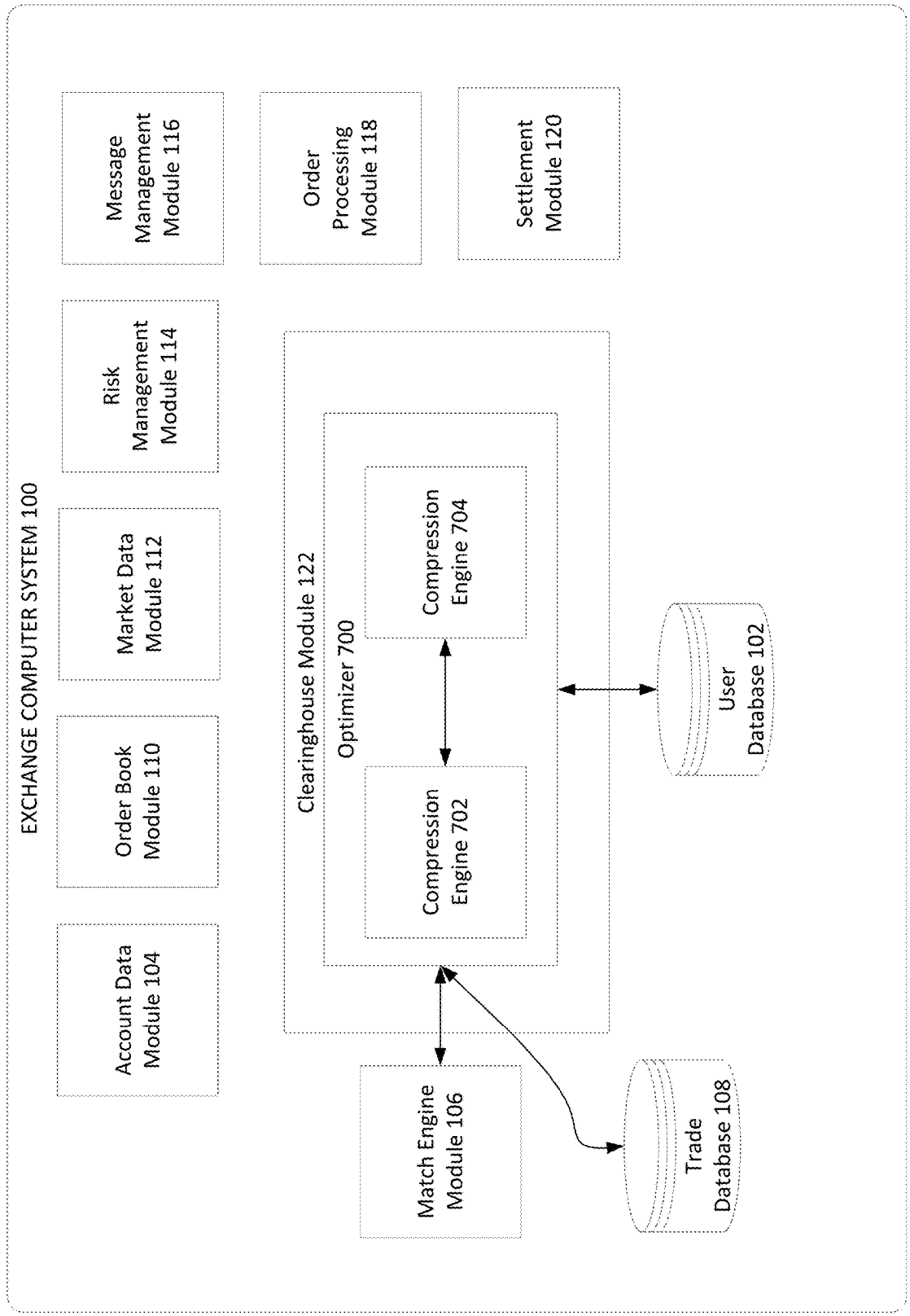
FIG. 7 depicts another block diagram of an exchange computing system including an optimization system, according to some embodiments.

In an embodiment, the optimization system includes two compression engines, instead of an expansion engine and a compression engine. Referring now to FIG. 7, there are depicted aspects of a system architecture in a block-diagram form and data flow between and among various system components for operation of an exchange computing system 100 including a system 700 for optimizing the size of a data file in accordance with one embodiment.

Clearinghouse module 122 of exchange computing system 100 includes optimizer 700, which optimizes the size of the data file. Optimizer 700 includes a plurality of compression engines 702 and 704. Compression engine 702 may be implemented as a separate component or as one or more logic components, such as on an FPGA which may include a memory or reconfigurable component to store logic and a processing component to execute the stored logic, e.g. computer program logic, stored in a memory, such as the memory 204 shown in FIG. 2 and described in more detail above with respect thereto, or other non-transitory computer readable medium, and executable by a processor, such as the processor 202 shown in FIG. 2 and described in more detail above with respect thereto, to cause the processor to receive a data file including a plurality of data elements, and to identify a plurality of data elements that can be represented by a few number of data elements, e.g., to identify financial instruments that are the underlying legs of a spread financial instrument, and to replace the underlying leg financial instruments in the portfolio data file with a new spread financial instrument. For example, the compression engine 702 identifies multiple leg line items in a portfolio that can be represented as a single spread line item, and replaces the underlying legs with the spread position.

Compression engine 704 may be implemented as a separate component or as one or more logic components, such as on an FPGA which may include a memory or reconfigurable component to store logic and a processing component to execute the stored logic, e.g. computer program logic, stored in a memory, such as the memory 204 shown in FIG. 2 and described in more detail above with respect thereto, or other non-transitory computer readable medium, and executable by a processor, such as the processor 202 shown in FIG. 2 and described in more detail above with respect thereto, to cause the processor to compress the size of the data file by reducing the number of data elements in the data file received from the compression engine 702.

It should be appreciated that the exchange computing system may list several spread financial instruments that are comprised of common underlying legs. In other words, a financial instrument may be an underlying leg for two different spreads. For example, a market participant portfolio data file may include positions in each of: spread financial instruments AB (composed of underlying leg financial instruments A and B) and AC (composed of underlying leg financial instruments A and C) and leg financial instruments A, B and C. Accordingly, the disclosed optimization system may be able to expand each of the spread positions into constituent leg positions (e.g., AB is expanded to A and B; AC is expanded to A and C), and then compress the portfolio data file by offsetting the leg financial instruments against each other (e.g., A line items are netted against each other if they can offset each other). In one embodiment, the optimization system prioritizes the offsetting of financial instruments that completely eliminates line items. For example, if there are several different line items related to financial instrument A that can offset each other, the optimization system prioritizes offsetting the A position with the lowest quantity because that position has the highest likelihood of being completely eliminated from the portfolio, i.e., the data element can be deleted from the data file.

Figure 8:
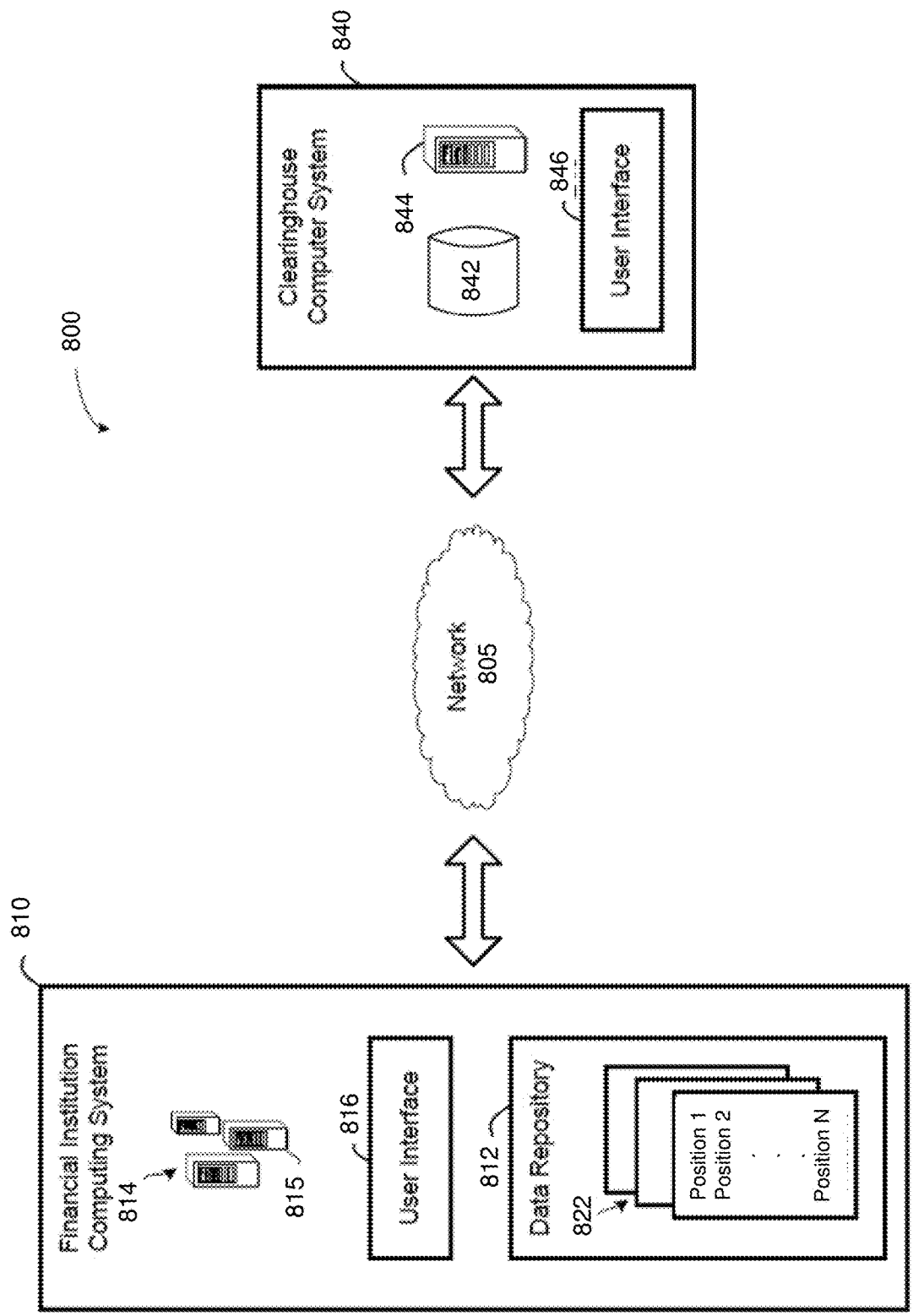
FIG. 8 depicts a block diagram of a system for reducing the size of a portfolio, according to some embodiments.

FIG. 8 shows a portion of an illustrative system 800 for reducing the size of a portfolio including a plurality of exchange traded derivatives according to at least some embodiments. In some cases, the illustrative system 800 may include a financial institution computing system 810 communicatively coupled to a clearinghouse computer system 840 via a network 805 (e.g., WAN 162, LAN 160, etc.). The financial institution computing system 810 may include a data repository 812, one or more computing devices 814, and, in some cases, at least one user interface 816. In some cases, the data repository 812 may store information about one or more portfolios 822 including a plurality of exchange traded derivatives, where the portfolios 822 may include information (e.g., positions) about two or more different exchange traded derivatives (e.g., position 1, position 2, position n, etc.). For example, the exchange traded derivatives information may include the name of the contract, quantity, value/price, and action (buy vs. sell) for each of the plurality of different positions of the portfolios 822. In some cases, the portfolios 822 may be associated with the financial institution, and/or one or more different customers of the financial institution. For example, a financial entity and/or a customer of the financial entity may desire to enter into one or more different exchange traded derivatives to hedge financial risk associated with an energy product. In some cases, a computing device 815 and/or the user interface 816 may be used to facilitate user access to the one or more of the portfolios 822. For example, a user may log into the financial institution computing system 810 via one or more user interface screens accessible via the user interface 816. In some cases, the user interface 816 is at a geographical location local to the financial institution computer system 810 and/or at a geographical location of the user. Each of the positions may be represented as a data element in a data file storing information about the portfolio.

In some cases, the clearinghouse computer system 840 may include one or more of a data repository 842, a computer device 844 and/or a user interface 846. The clearinghouse computer system 840 may be communicatively coupled to at least one financial institution computer system, such as the financial institution computing system 810 via the network 805. In some cases, the clearinghouse computer system 840 may be configured to obtain information about one or more of the portfolios 822, process the information to compress the data files associated with the portfolios 822 to reduce one or more line items associated with the portfolios 822 and/or to reduce a gross notional value associated with the portfolios 822 to reduce a total capital charge incurred by the financial institution in relation to the portfolios 822 and communicate information about the compressed data files to the financial institution computing system 810.

FIG. 9 illustrates an example flowchart 900 for reducing data elements in a data file, according to an embodiment of the present disclosure. Embodiments may involve all, more or fewer actions than the illustrated actions. The actions may be performed in the order or sequence shown, or in a different sequence. The actions may be performed simultaneously, or in a parallel or overlapping fashion. The method may be performed by processing logic that may comprise hardware (circuitry, dedicated logic, etc.), software, or a combination of both. In one example, the method is performed by the computer system 100 of FIG. 1, while in some other examples, some or all of the method may be performed by another machine.

Method 900 includes receiving 902, by a processor, a data file including one or more primary data elements. The processor stores 904 the data file in a memory coupled to the processor. The processor generates 906, from at least one of the one or more primary data elements, a plurality of supplemental data elements. The processor determines 908 whether any of the plurality of supplemental data elements and any of the primary data elements offset each other. Upon determining that at least one of the plurality of supplemental data elements and at least one of the primary data elements offset each other, the processor deletes 910, from the data file, at least one of the offset supplemental data elements or primary data elements.

Data elements that are part of a data file received by the optimization system may be referred to as primary data elements. Data elements that are generated by the optimization system may be referred to as supplemental data elements. For example, the data file may be a portfolio of exchange traded derivatives. The data elements may be line items, or positions in the portfolio data file. The data elements may include primary data elements that include at least one spread financial instrument, which can be expanded/devolved into underlying leg financial instruments. The underlying leg financial instruments generated by the optimization system processor may be referred to as supplemental data elements. The optimization system then offsets at least one primary data element (e.g., a financial instrument existing in the received portfolio) with at least one of the supplement data elements (e.g., a financial instrument position generated by the optimization system).

A data element that represents a spread financial instrument may be associated with two data elements. For example, referring to FIG. 6A, the optimizer 500 is configured to detect that position/data element 608 in portfolio 602 is actually for a spread financial instrument associated with two other financial instruments, and that those two other financial instruments are also represented by other data elements in the same portfolio 602.

Data elements may be associated with a financial instrument and a transaction type, and data elements offset each other when they are associated with the same financial instrument and opposing transaction types. Data elements may also be associated with a quantity, and if two data elements offset each other (e.g., they are associated with the same financial instrument and opposing transaction types), and in addition, are associated with the same quantity, the optimizer removes both data elements from the data file. If two data elements offset each other (e.g., they are associated with the same financial instrument and opposing transaction types), but are associated with different quantities, the optimizer removes the data element with the lesser quantity from the data file.

In one embodiment, a computer implemented method for optimizing the memory associated with storing a data file includes receiving, by a processor, a data file including a first data element and a second data element; generating, from the first data element, at least a third and fourth data element; upon determining that one of the third or fourth data elements offsets the second data element, deleting, from the data file, the one of the third or fourth data elements and the second data element.

CONCLUSION

The illustrations of the embodiments described herein are intended to provide a general understanding of the structure of the various embodiments. The illustrations are not intended to serve as a complete description of all of the elements and features of apparatus and systems that utilize the structures or methods described herein. It should be appreciated that wherever practicable, similar or like reference numbers may be used in the figures and may indicate similar or like functionality. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the described embodiments should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

The invention claimed is:

1. A computer system comprising:
a processor; and
a non-transitory memory containing computer executable instructions that, when executed by the processor, cause the processor to implement:
an expansion engine configured to:
receive a portfolio data file including a plurality of original open positions;
identify one or more spread positions and one or more remaining open positions from the plurality of original open positions;
generate, based on each spread position of the one or more spread positions, a plurality of legs underlying the spread position; and
replace each spread position of the one or more spread positions with the plurality of legs underlying each spread position; and
a compression engine configured to:
determine that at least one of the plurality of legs and at least one of the one or more remaining open positions are counter to each other; and
delete, from the portfolio data file, at least one of the plurality of legs or the one or more remaining open positions that are counter to each other.

2. The computer system of claim 1, wherein the expansion engine receives one or more preferences specifying a subset of the plurality of original open positions, and wherein the expansion engine and the compression engine operate on only the specified subset.

3. The computer system of claim 1, wherein, upon replacement of the one or more spread positions, the expansion engine generates a new portfolio data file based on the received portfolio data file and transmits the new portfolio data file to the compression engine for processing.

4. The computer system of claim 1, wherein the compression engine receives one or more criteria which defines which of the plurality of legs and which of the one or more remaining open positions are counter to each other, wherein the determination is based on the criteria.

5. The computer system of claim 1,
wherein each of the plurality of remaining open positions and each of the plurality of legs are characterized by a quantity, and
wherein when the compression engine determines that at least one of the plurality of legs and/or at least one of the one or more remaining open positions may be counter to each other by more than one of the plurality of legs and/or the one or more remaining open positions, the compression engine selects the leg or remaining open position which counters the most of the quantity of the at least one of the plurality of legs and/or at least one of the one or more remaining open positions.

6. The computer system of claim 1,
wherein each of the one or more remaining open positions or the plurality of legs is associated with a financial instrument and a transaction type,
wherein the transaction type may be one of acquire a financial instrument or relinquish a financial instrument, and
wherein the legs and/or the one or more remaining open positions are counter to each other when they are associated with the same financial instrument but opposing transaction types.

7. The computer system of claim 1, wherein a size of the portfolio data file after at least one of the legs or remaining open positions that are counter to each other is deleted is smaller than the size of the portfolio data file before the plurality of legs is generated.

8. The computer system of claim 7, wherein the size of the portfolio data file after the plurality of legs is generated is larger than the size of the portfolio data file before the plurality of legs is generated.

9. The computer system of claim 1, wherein the portfolio data file is associated with a derivatives portfolio of a market participant.

10. The computer system of claim 9, wherein a spread position comprises a derivative spread financial instrument, and the plurality of legs comprise leg financial instruments underlying the derivatives spread financial instrument.

11. A computer implemented method comprising:
receiving, by an expansion engine implemented by a processor, a portfolio data file including a plurality of original open positions;
identifying, by the expansion engine, one or more spread positions and one or more remaining open positions from the plurality of original open positions;
generating, by the expansion engine based on each spread position of the one or more spread positions, a plurality of legs underlying each spread position;
replacing, by the expansion engine, each spread position with the plurality of legs underlying the spread position;
determining, by a compression engine implemented by the processor, that at least one of the plurality of legs and at least one of the plurality of remaining open positions are counter to each other; and
deleting, by the compression engine, from the portfolio data file, the at least one of the plurality of legs or the one or more remaining open positions that are counter to each other.

12. The computer implemented method of claim 11, further comprising:
receiving, by the expansion engine, one or more preferences specifying a subset of the plurality of original open positions, and wherein the expansion engine and the compression engine operate on only the specified subset.

13. The computer implemented method of claim 11, further comprising:
generating, by the expansion engine, upon replacing the one or more spread positions, a new portfolio data file based on the received portfolio data file; and
transmitting, by the expansion engine, the new portfolio data file to the compression engine for processing.

14. The computer implemented method of claim 11, further comprising:
receiving, by the compression engine, one or more criteria which defines which of the plurality of legs and which of the one or more remaining open positions are counter to each other, wherein the determining is based on the criteria.

15. The computer implemented method of claim 11,
wherein each of the one or more remaining open positions and each of the plurality of legs are characterized by a quantity, and
wherein when the compression engine determines that at least one of the plurality of legs and/or at least one of the one or more remaining open positions may be counter to each other by more than one of the plurality of legs and/or the one or more remaining open positions, the compression engine selects the leg or remaining open position which counters the most of the quantity of the at least one of the plurality of legs and/or at least one of the one or more remaining open positions.

16. The computer implemented method of claim 11,
wherein each of the one or more remaining open positions or the plurality of legs is associated with a financial instrument and a transaction type,
wherein the transaction type may be one of acquire a financial instrument or relinquish a financial instrument, and
wherein the plurality of remaining open positions and/or legs are counter to each other when they are associated with the same financial instrument but opposing transaction types.

17. The computer implemented method of claim 11, wherein a size of the portfolio data file after at least one of the legs or remaining open positions that are counter to each other is deleted is smaller than the size of the portfolio data file before the plurality of legs is generated.

18. The computer implemented method of claim 17, wherein the size of the portfolio data file after the plurality of legs is generated is larger than the size of the portfolio data file before the plurality of legs is generated.

19. The computer implemented method of claim 11, wherein the portfolio data file is associated with a derivatives portfolio of a market participant.

20. The computer implemented method of claim 19, wherein the spread position comprises a derivative spread financial instrument, and the plurality of legs comprise leg financial instruments underlying the derivatives spread financial instrument.

21. A computer system comprising:
means for receiving a portfolio data file including a plurality of original open positions;
means for identifying one or more spread positions and one or more remaining open positions from the plurality of original open positions;
means for generating, based on each spread position of the one or more spread positions, a plurality of legs underlying the spread position;
means for replacing each identified spread position with the plurality of legs underlying the spread position;
means for determining that at least one of the plurality of legs and at least one of the one or more remaining open positions are counter to each other; and
means for deleting, from the portfolio data file, the at least one of the plurality of legs or the one or more remaining open positions that are counter to each other.

* * * * *